(12) United States Patent
Kao

(10) Patent No.: US 12,168,989 B2
(45) Date of Patent: Dec. 17, 2024

(54) SELF-DRILLING EXPANDABLE ANCHOR AND METHODS OF USE AND INSTALLATION THEREOF

(71) Applicant: Illinois Tool Works Inc., Glenview, IL (US)

(72) Inventor: Eddie Kao, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 462 days.

(21) Appl. No.: 17/323,530

(22) Filed: May 18, 2021

(65) Prior Publication Data

US 2021/0372449 A1 Dec. 2, 2021

Related U.S. Application Data

(60) Provisional application No. 63/031,231, filed on May 28, 2020.

(51) Int. Cl.
*B25B 13/50* (2006.01)
*F16B 13/00* (2006.01)
*B25B 23/00* (2006.01)

(52) U.S. Cl.
CPC ............ *F16B 13/003* (2013.01); *B25B 13/50* (2013.01); *B25B 23/0035* (2013.01)

(58) Field of Classification Search
CPC .. F16B 13/003; F16B 19/083; F16B 19/1072; F16B 13/002; F16B 13/065; F16B 13/124; B25B 13/50; B25B 23/0035
USPC .................. 411/29, 34, 38, 401, 389, 455
See application file for complete search history.

(56) References Cited

U.S. PATENT DOCUMENTS

| | | | |
|---|---|---|---|
| 1,164,322 A | 12/1915 | Yeatman | |
| 2,871,749 A | 2/1959 | Kalb | |
| 3,659,449 A * | 5/1972 | Abernathy | B25B 27/0014 29/523 |
| 3,789,728 A | 2/1974 | Shackelford | |
| 3,888,156 A * | 6/1975 | Fima | F16B 13/061 411/38 |
| 4,055,051 A | 10/1977 | Finney | |
| 4,121,444 A | 10/1978 | Duran | |
| 4,254,542 A * | 3/1981 | Craig | F16B 35/041 411/401 |
| 4,331,414 A * | 5/1982 | Wheatley, Jr. | F16B 39/30 411/311 |
| 4,388,031 A * | 6/1983 | Rodgers | F16B 19/1072 D8/382 |
| 4,560,312 A * | 12/1985 | Grady | F16B 19/083 411/55 |
| 4,617,692 A * | 10/1986 | Bond | B23B 51/08 411/397 |

(Continued)

FOREIGN PATENT DOCUMENTS

| | | | | |
|---|---|---|---|---|
| EP | 1350965 A2 * | 10/2003 | | B25B 27/0007 |
| WO | WO 2008/041836 | 4/2008 | | |

OTHER PUBLICATIONS

SAMMYS® 2018-2019 Product Catalog (15 pages).
Canadian Office Action from Canadian Application No. 3,119,671, dated Aug. 31, 2023 (5 pages).

*Primary Examiner* — William D Hutton, Jr.
*Assistant Examiner* — Dil K. Magar
(74) *Attorney, Agent, or Firm* — Neal, Gerber & Eisenberg LLP

(57) ABSTRACT

A self-drilling expandable anchor operable with a self-drilling expandable anchor installation tool.

17 Claims, 33 Drawing Sheets

(56) References Cited

U.S. PATENT DOCUMENTS

| | | | |
|---|---|---|---|
| 4,657,456 A | 4/1987 | Anquetin | |
| 4,789,282 A * | 12/1988 | Abraham | F16B 13/124 411/24 |
| 4,789,283 A * | 12/1988 | Crawford | F16B 19/008 411/902 |
| 4,836,062 A * | 6/1989 | LaTorre | B25B 27/0014 81/55 |
| 4,875,815 A | 10/1989 | Phillips, II | |
| 4,984,938 A * | 1/1991 | Scott, Jr. | F16B 43/002 411/428 |
| 4,986,710 A | 1/1991 | Kovarik | |
| 4,990,042 A * | 2/1991 | Szayer | F16B 19/083 470/11 |
| 5,147,166 A * | 9/1992 | Harker | F16B 13/061 411/29 |
| 5,168,781 A | 12/1992 | Tenuta | |
| 5,207,750 A * | 5/1993 | Rapata | F16B 13/061 411/908 |
| 5,286,151 A * | 2/1994 | Eshraghi | F16B 19/1054 29/524.1 |
| 5,299,441 A * | 4/1994 | Shinjo | F16B 19/083 72/356 |
| 5,313,680 A | 5/1994 | Ringler | |
| 5,419,664 A | 5/1995 | Hengesbach et al. | |
| 5,647,710 A * | 7/1997 | Cushman | F16B 35/00 411/397 |
| 6,223,375 B1 | 5/2001 | Vaughan, Jr. | |
| 6,273,655 B1 * | 8/2001 | McAlpine | F16B 13/0841 411/72 |
| 6,443,680 B1 * | 9/2002 | Bodin | F16B 23/0038 411/389 |
| 6,524,046 B2 | 2/2003 | Hsu | |
| 6,551,040 B1 * | 4/2003 | Terry | F16B 19/1072 411/45 |
| 6,648,557 B1 | 11/2003 | Morrow et al. | |
| 6,935,821 B2 * | 8/2005 | Bodin | B25B 27/0007 411/37 |
| 7,296,499 B2 * | 11/2007 | Bodin | B25B 27/0007 81/55 |
| 7,494,310 B1 * | 2/2009 | Bodin | F16B 13/003 411/37 |
| 8,286,736 B2 | 10/2012 | Weaver et al. | |
| 8,671,805 B2 | 3/2014 | Henderson et al. | |
| 8,920,091 B2 * | 12/2014 | Heinrich | F16B 5/0275 411/389 |
| 9,541,116 B2 | 1/2017 | Cabaj et al. | |
| 9,989,080 B1 * | 6/2018 | Kunken | F16B 13/0808 |
| 2003/0190211 A1 * | 10/2003 | Bodin | B25B 31/00 411/29 |
| 2004/0067121 A1 * | 4/2004 | Huang | F16B 13/124 411/32 |
| 2005/0058521 A1 * | 3/2005 | Stevenson | F16B 13/143 411/82 |
| 2005/0163585 A1 * | 7/2005 | Bodin | F16B 13/003 411/31 |
| 2006/0048611 A1 * | 3/2006 | Berdin | F16B 43/001 411/29 |
| 2006/0104742 A1 * | 5/2006 | Fleming | F16B 5/0275 411/389 |
| 2006/0145431 A1 * | 7/2006 | Chang | B25B 23/12 279/74 |
| 2006/0260446 A1 * | 11/2006 | Chang | B25B 23/0035 81/177.75 |
| 2007/0292234 A1 * | 12/2007 | Panasik | F16B 13/003 411/340 |
| 2008/0008553 A1 * | 1/2008 | Gillis | F16B 13/025 405/259.4 |
| 2008/0008554 A1 * | 1/2008 | Lu | F16B 13/003 411/29 |
| 2008/0292422 A1 * | 11/2008 | Lin | F16B 13/124 411/31 |
| 2009/0092458 A1 * | 4/2009 | Moroney | F16B 13/0858 411/29 |
| 2010/0212249 A1 * | 8/2010 | Pettingale | F16B 35/041 52/698 |
| 2010/0316465 A1 * | 12/2010 | Gillis | F16B 13/065 411/29 |
| 2011/0314768 A1 * | 12/2011 | Johnson | B25B 13/065 52/745.21 |
| 2014/0026716 A1 * | 1/2014 | Kasonde | B23P 15/32 76/108.1 |
| 2014/0079496 A1 * | 3/2014 | Cousineau | F16B 13/002 408/81 |
| 2014/0165794 A1 * | 6/2014 | Chiang | B25B 23/0035 81/451 |
| 2016/0160906 A1 * | 6/2016 | Blaess | F16C 11/06 403/122 |
| 2017/0203193 A1 * | 7/2017 | Powell | A63C 17/012 |
| 2018/0141190 A1 | 5/2018 | Prunean | |
| 2018/0180080 A1 * | 6/2018 | Grice | F16B 37/067 |
| 2018/0229350 A1 | 8/2018 | Naoi et al. | |
| 2018/0283434 A1 * | 10/2018 | Kunken | F16B 13/0808 |

* cited by examiner

SELF-DRILLING EXPANDABLE ANCHOR AND METHODS OF USE AND INSTALLATION THEREOF

PRIORITY CLAIM

This application claims priority to and the benefit of U.S. Provisional Patent Application Ser. No. 63/031,231, filed May 28, 2020, the entire contents of which are incorporated herein by reference.

CROSS-REFERENCE TO RELATED APPLICATION

This application is related to the following commonly owned co-pending patent application: U.S. application Ser. No. 17/323,527, entitled "SELF-DRILLING EXPANDABLE ANCHOR INSTALLATION TOOL AND METHODS OF USE THEREOF".

BACKGROUND

Various construction and maintenance workers (such as plumbers, electricians, and sprinkler fitters) often have to hang items (such as pipes, conduit, cables, ducts, and lights) from structures (such as ceilings, roofs, decking, beams, joists, Z purlins, and trusses). Various known expandable anchors are employed for hanging such items from such structures. Various known expandable anchor installation tools are sometimes employed for installing such known expandable anchors in such structures.

While various proposed expandable anchors have drill tips, such proposed expandable anchors having drill tips have not been commercialized, and thus various known commercially expandable anchors are not self-drilling. For each expandable anchor that is not self-drilling, a suitable hole in the structure to which that expandable anchor is to be attached must first be drilled out or otherwise suitably formed in that structure. This process increases the installation time, decreases ease of use, and increases cost.

Thus, while various known expandable anchors and expandable anchor installation tools are often satisfactory for various purposes, there is a continuing need for improved expandable anchors and expandable anchor installation tools that are self-drilling, that decrease the installation time, that increase the ease of use, that are more cost effective.

SUMMARY

Various embodiments of the present disclosure provide self-drilling expandable anchors and self-drilling expandable anchor installation tools that are self-drilling, that decrease the installation time, that increase the ease of use, and that are more cost effective than various known expandable anchors and known expandable anchor installation tools. Various embodiments of the present disclosure also provide methods of use and installation of such self-drilling expandable anchors and use of such self-drilling expandable anchor installation tools.

Various embodiments of the self-drilling expandable anchor of the present disclosure include an expandable member, a threaded member configured to extend through and from both ends of the expandable member, a hanger attachable to the first end of the threaded member, a drill head attachable to the second end of the threaded member, and a friction reducing element positionable on the threaded member between the hanger and the expandable member. In certain of these embodiments, the threaded member has a hex head at one end that is connected the hanger, and outer threads at the opposite end that connect the threaded member to the drill head. In certain of these embodiments, the threaded member has a threads at one end that connect the threaded member to the hanger, and the opposite end is fixedly connected to the drill head.

For each of these various embodiments, the expandable member, the threaded member, the hanger, the drill head, and the friction reducing element of the self-drilling expandable anchor are configured such that: (a) a self-drilling expandable anchor installation tool and a drive tool can be connected to the hanger; (b) the installation tool and the drive tool can be employed to rotate the hanger, the expandable member, the threaded member, and the drill head to drill a hole in a structure; (c) the drill head, part of the expandable member, and part of the threaded member can be inserted through the drilled hole; (d) part of the installation tool can be employed to hold a base of the expandable member stationary while another part of the installation tool can be employed to rotate the hanger and the threaded member to cause part of the expandable member to expand; (e) after the part of the expandable member expands, the base and the expanded part of the expandable member secure the self-drilling expandable anchor to the structure; and (f) an item can be attached to the hanger to hang the item from the structure via the self-drilling expandable anchor.

Various embodiments of the self-drilling expandable anchor installation tool of the present disclosure include a driver, an expandable member engagement sleeve movably mounted on the driver, and a handle pivotally connected to the expandable member engagement sleeve. The driver, the expandable member engagement sleeve, and the handle of the installation tool are configured such that: (a) the driver and a drive tool (such as a drill) can be connected to a hanger of a self-drilling expandable anchor (such as described above); (b) the installation tool and the drive tool can be employed to rotate the hanger, an expandable member, a threaded member, and a drill head of the self-drilling expandable anchor to drill a hole in a structure; (c) the installation tool can be employed to insert the drill head, part of the expandable member, and part of the threaded member through the drilled hole; (d) the expandable member engagement sleeve and the handle can then be employed to engage and hold a base of the expandable member stationary while the driver can be employed to rotate the hanger and the threaded member to cause part of the expandable member to expand; and (e) after that part of the expandable member expands such that the base and that expanded part of the expandable member secure the self-drilling expandable anchor to the structure, the installation tool can be detached from the self-drilling expandable anchor.

In certain such embodiments of the self-drilling expandable anchor installation tool, the expandable member engagement sleeve is forwardly movable by the installer into engagement with the base of the expandable member of the self-drilling expandable anchor to enable the installer to hold the expandable member stationary.

In certain other such embodiments of the self-drilling expandable anchor installation tool, the self-drilling expandable anchor is positioned inside of the expandable member engagement sleeve, and as the self-drilling expandable anchor moves forwardly past a certain point in the expandable member engagement sleeve, the base of the expandable member engages a base engager of the expandable member engagement sleeve of the self-drilling expandable anchor installation tool to enable the installer to hold the expandable member stationary.

Other objects, features, and advantages of the present disclosure will be apparent from the following detailed disclosure and accompanying drawings.

DETAILED DESCRIPTION

Figure 1:
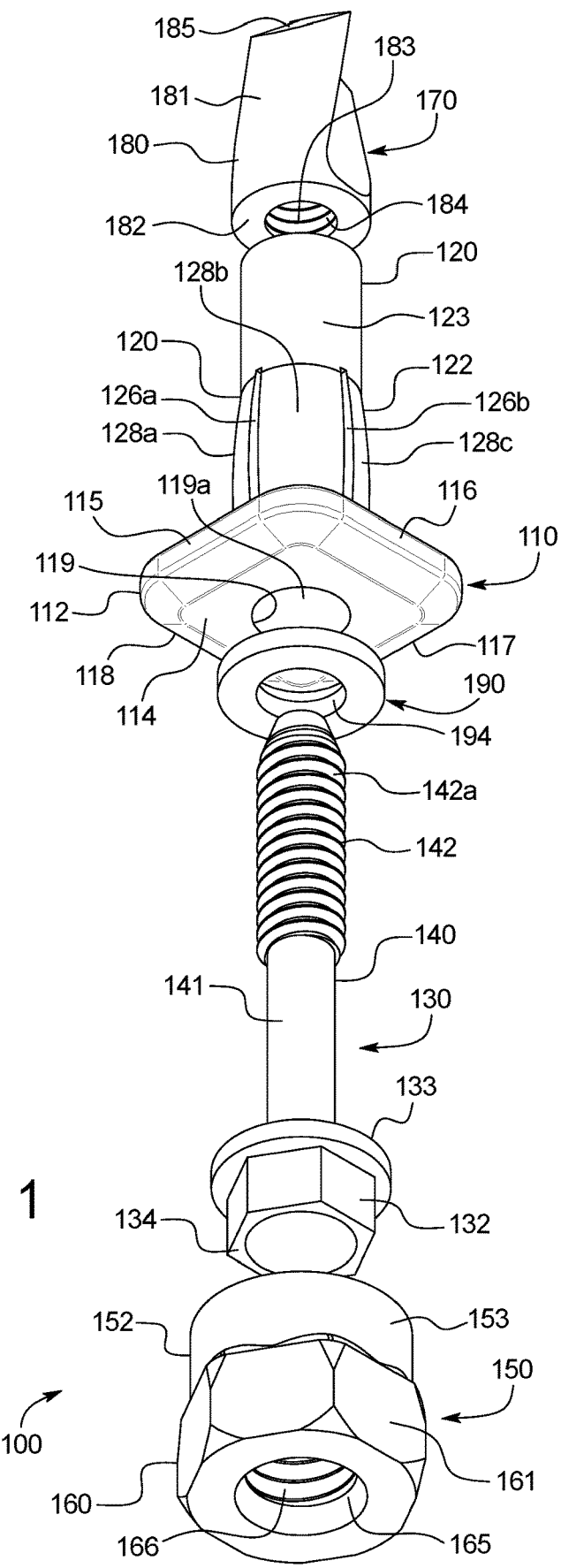
FIG. 1 is an exploded bottom perspective view of a self-drilling expandable anchor of one example embodiment of the present disclosure.
Figure 2:
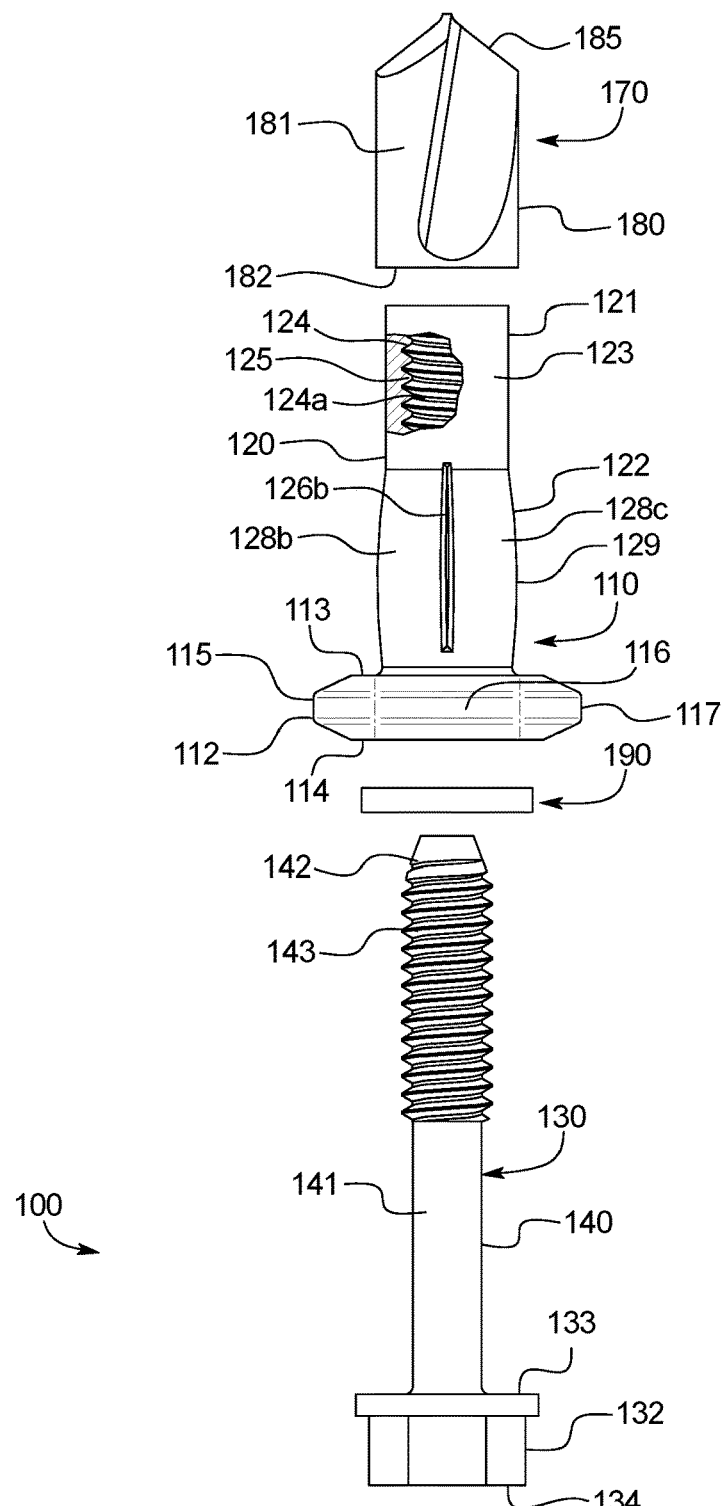
FIG. 2 is an exploded side view of the self-drilling expandable anchor of FIG. 1, with a portion broken away.
Figure 2:
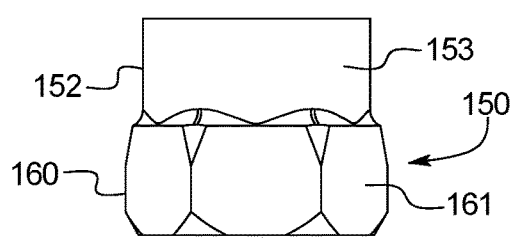

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Referring now to the figures, FIGS. 1, 2, 3, 4, 5, 24A, 24B, 24C, 24D, 24E, 25A, 25B, 25C, 25D, and 25E illustrate one example embodiment of a self-drilling expandable anchor of the present disclosure, which is generally indicated by numeral 100. This illustrated example self-drilling expandable anchor 100 includes: (1) an expandable member 110; (2) a threaded member 130 configured to extend through and from both ends of the expandable member 110; (3) a hanger 150 attachable to the first or lower end of the threaded member 130; (4) a drill head 170 attachable to the second or upper end of the threaded member 130; and (5) a friction reducing element 190 positionable on the threaded member 130 between the hanger 150 and the expandable member 110. Generally, the expandable member 110, the threaded member 130, the hanger 150, the drill head 170, and the friction reducing element 190 of the self-drilling expandable anchor 100 are configured such that: (a) a self-drilling expandable anchor installation tool (such as installation tool 500 or installation tool 600 described below) and a drive tool (such as a drill) can be connected to the hanger 150; (b) the installation tool and the drive tool can be employed to rotate the hanger 150, the expandable member 110, the threaded member 130, and the drill head 170 to drill a hole in a structure; (c) the drill head 170, part of the expandable member 110, and part of the threaded member 130 can be inserted through the drilled hole; (d) part of the installation tool can be employed to hold a base 112 of the expandable member 110 stationary while another part of the installation tool can be employed to rotate the hanger 150 and the threaded member 130 to cause part of the expandable member 110 to expand; (e) after the part of the expandable member 110 expands, the base 112 and the expanded part of the expandable member 110 secure the self-drilling expandable anchor 100 to the structure; and (f) an item can be attached to the hanger 150 to hang the item from the structure via the self-drilling expandable anchor 100.

More specifically, the expandable member 110 includes: (a) a base 112; and (b) an expandable tube 120 integrally (such as monolithically) connected to and extending from a front surface 113 of the base 112. The base 112 has one or more larger outer dimensions than the expandable tube 120. In this illustrated example, the base 112 has a larger outer width and a larger outer length then that of the expandable tube 120. In this illustrated example embodiment, the base 112 is generally square and the expandable tube 120 is generally cylindrical; although it should be appreciated that this may vary in accordance with the present disclosure. In this illustrated example embodiment, the base 112 and the expandable tube 110 are integrally connected (such as monolithically formed together); although it should be appreciated that this may vary in accordance with the present disclosure. In various embodiments, the expandable member 110 is made from a suitable metal (such as steel); although it should be appreciated that the expandable member can be made from other suitable materials.

Figure 24A:
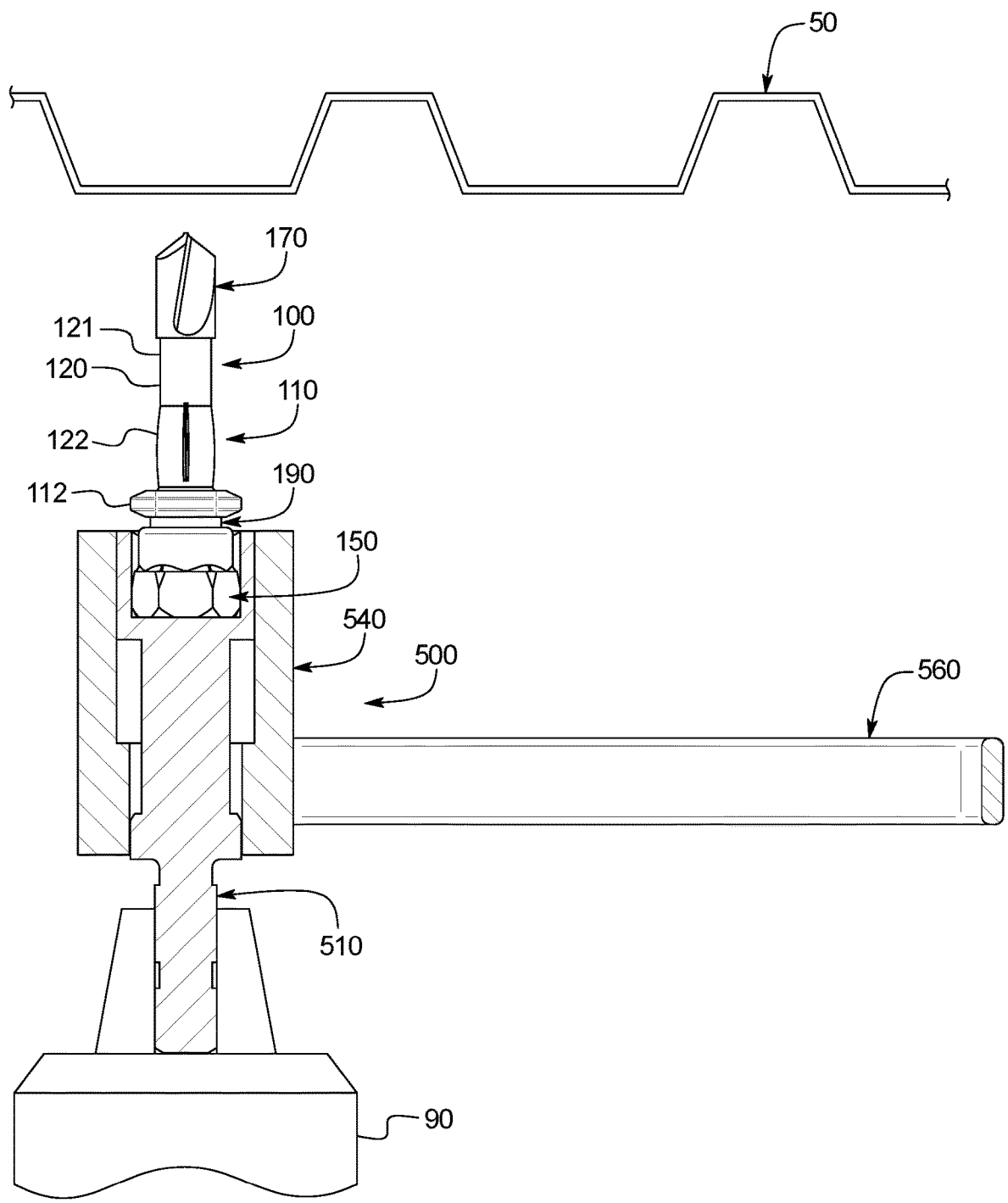
FIGS. 24A, 24B, 24C, 24D, and 24E are a series of partial cross-sectional and partial perspective views showing the method of use and installation of the self-drilling expandable anchor of FIG. 1 into a structure using the self-drilling expandable anchor installation tool of FIG. 11.
Figure 24B:
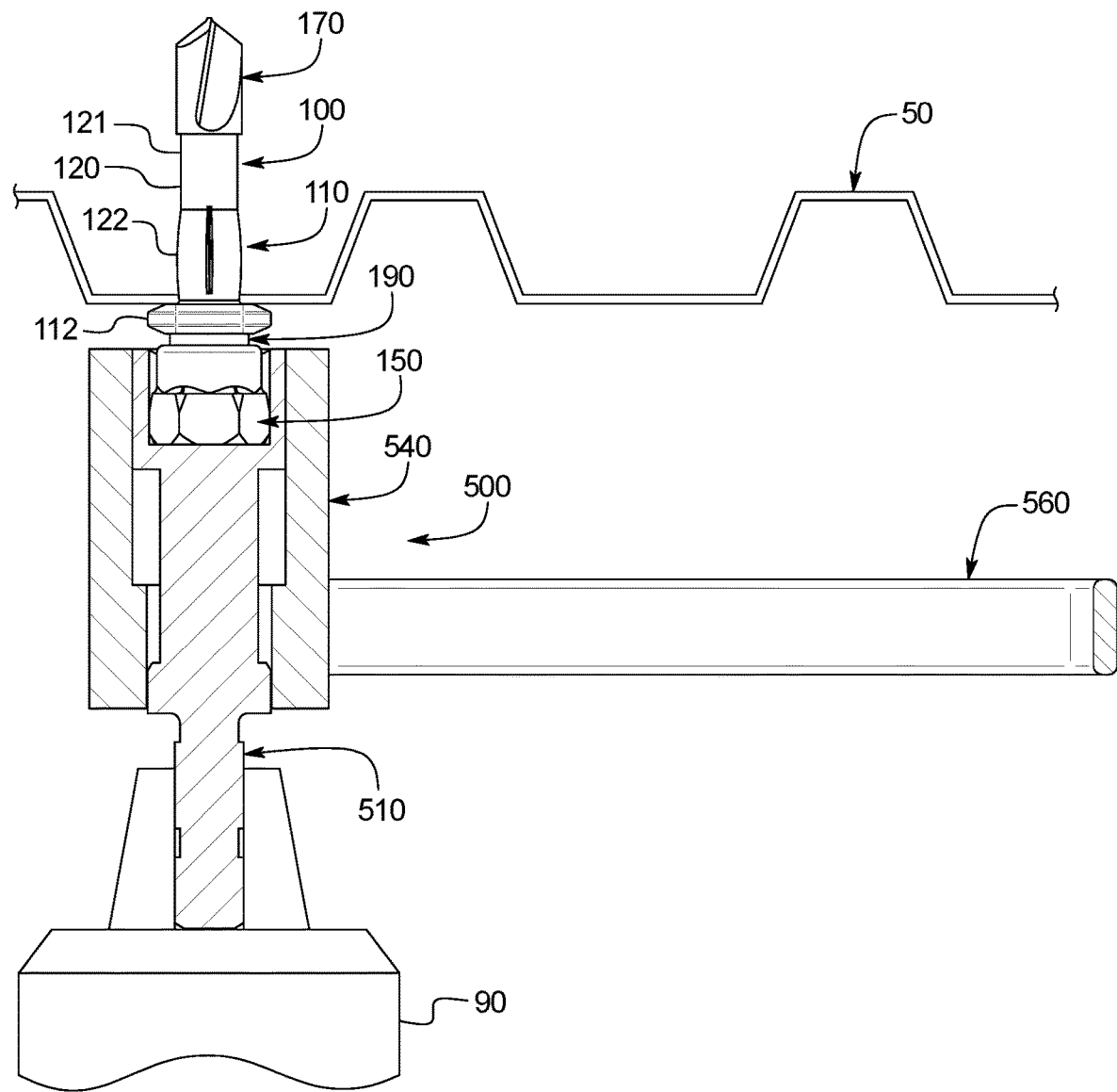
Figure 24C:
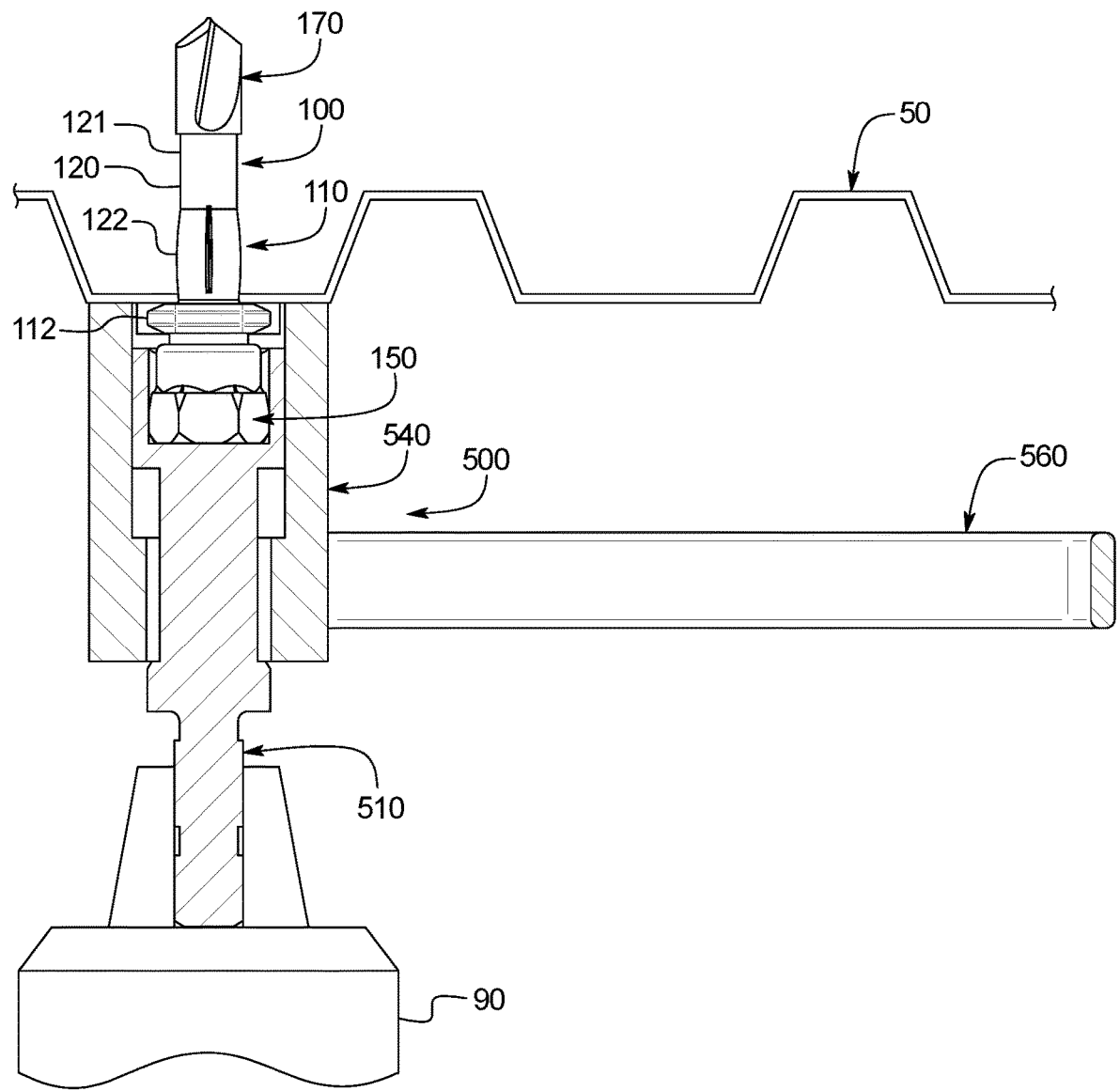

The base 112 has the front surface 113, a back surface 114, and four side edges 115, 116, 117, and 118. Each respective side edge 115, 116, 117, and 118 includes two opposing top and bottom inwardly beveled surfaces and an outer surface (not labeled); although this may vary in accordance with the present disclosure. The base 110 has an inner cylindrical surface 119 that defines a cylindrical inner passageway 119a that extends through the base 112 from the back surface 114 to the front surface 113. This inner passageway 119a is aligned with an inner passageway 124a that extends though the expandable tube 120, and thus the entire expandable member 110 defines an inner passageway. In this illustrated example embodiment, the inner cylindrical surface 119 is not threaded. It should be appreciated that although the base is shown as generally square, the base can be any suitable shape (such as an rectangular, octagon, hexagon, or oval) as long as the base has enough purchase area to engage the structure (such as shown in FIGS. 24E and 25E) and can be held stationary by the self-drilling anchor assembly installation tool (such as shown in FIGS. 24C, 24D, 25C, and 25D) and as further described below.

The expandable tube 120 includes a first or front portion 121, a second or back portion 122, an outer surface 123, and an inner surface 124. The inner surface 124 of the expandable tube 120 defines the inner passageway 124a. At least part of the inner surface 124 of the front portion 121 is threaded (i.e., includes or defines inner threads 125). In this illustrated example embodiment, the rest of the inner surface 124 of the cylindrical expandable tube 120 does not include inner threads, and particularly the back portion 122 does not include inner threads. The cylindrical expandable tube 120 and primarily the back portion 122 defines a series of longitudinally extending spaced apart slots 126a, 126b, 126c (not shown), and 126d (not shown) around the expandable tube 120. The slots 126a, 126b, 126c, and 126d facilitate the longitudinal collapse and expansion of the back portion 122 cylindrical tube 120 as shown in FIGS. 5, 24D, 24E, 25D, and 25E, and as further described below. The cylindrical expandable tube 120 and the series of longitudinally extending spaced apart slots 126a, 126b, 126c, and 126d facilitate the forming of outwardly extending anchoring strips 128a, 128b, 128c, and 128d (not shown) when the back portion 122 of the expandable tube 120 is longitudinally collapsed and expanded as shown in FIGS. 5, 24D, 24E, 25D, and 25E. The back portion 122 of the expandable tube 120 is formed with a slight outward bulge 129 to facilitate the collapse and expansion of anchoring strips 128a, 128b, 128c, and 128d. It should be appreciated that the inner threads 125 of the front portion 121 of the expandable tube 120 enable engagement by the outer threads 142a of the threaded member 130 to facilitate the collapse and expansion of the anchoring strips 128a, 128b, 128c, and 128d, as further described below. In various embodiments, the inner threads 125 are configured to be engaged by the outer threads 142a on the front end of the threaded member 130 such that a few turns of the threaded member 130 causes the collapsing and expansion of the outwardly extending anchoring strips 128a, 128b, 128c, and 128d. It should be appreciated that although the expandable tube is shown as cylindrical, the expandable tube can be any suitable shape (such as an octagon, hexagon, square, or oval) as long as the expandable tube will fit through the hole drilled in the support and collapse and expand in a suitable manner.

The threaded member 130 is configured to extend through and from both ends of the expandable member 110. The threaded member 130 includes a hex head 132 and a shaft 140 integrally (such as monolithically) connected to and extending from a front surface 133 of the hex head 132. The hex head 132 has the front surface 133, a back surface 134, and six engagable side edges (not labeled). It should be appreciated that the head 130 can be otherwise configured such as with a different shape and/or a different quantity of sides or side edges in accordance with the present disclosure. The shaft 140 has a first section 141 that does not have outer threads and a second section 142 that has outer threads 142a. The outer threads 142a are configured to engage the inner threads 125 of the front section 121 of the expandable tube 120. In certain embodiments, the outer threads 142a are configured to engage the inner threads 184 of the connector 180 of the drill head 170, as further described below. In other embodiments, the drill head 170 is otherwise suitably fixedly connected to the second end of the shaft 140 of the threaded member 130, as further described below.

The hanger 150 that is attachable to the threaded member 130 includes (a) a threaded member connector 152, and (b) a hanger base 160 integrally (such as monolithically) connected to and extending from the threaded member connector 152. In various embodiments, the hanger 150 is made from a suitable metal (such as steel); although it should be appreciated that the hanger can be made from other suitable materials.

Figure 4:
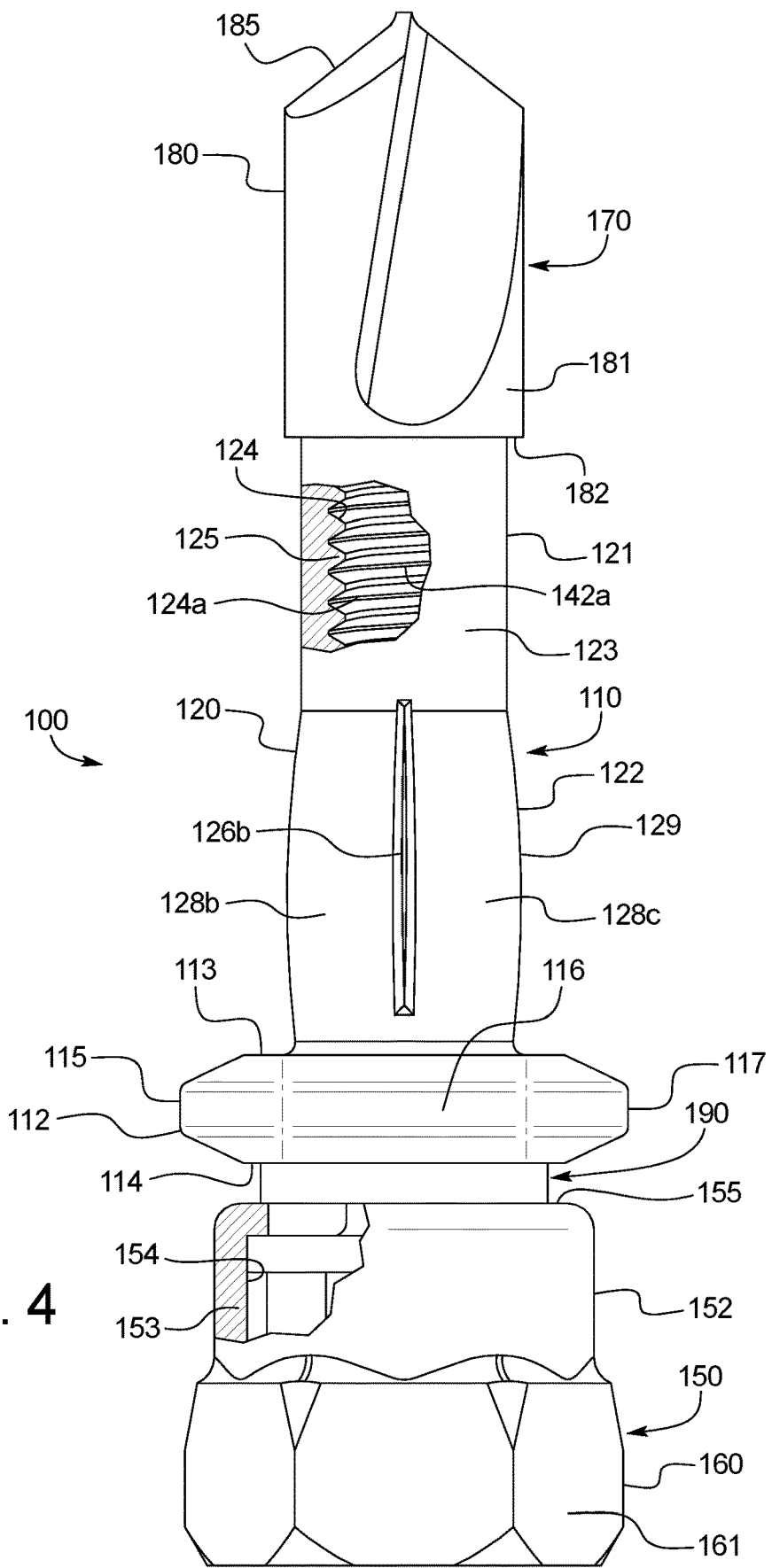
FIG. 4 is a fully assembled side view of the self-drilling expandable anchor of FIG. 1, with certain portions broken away.
Figure 5:
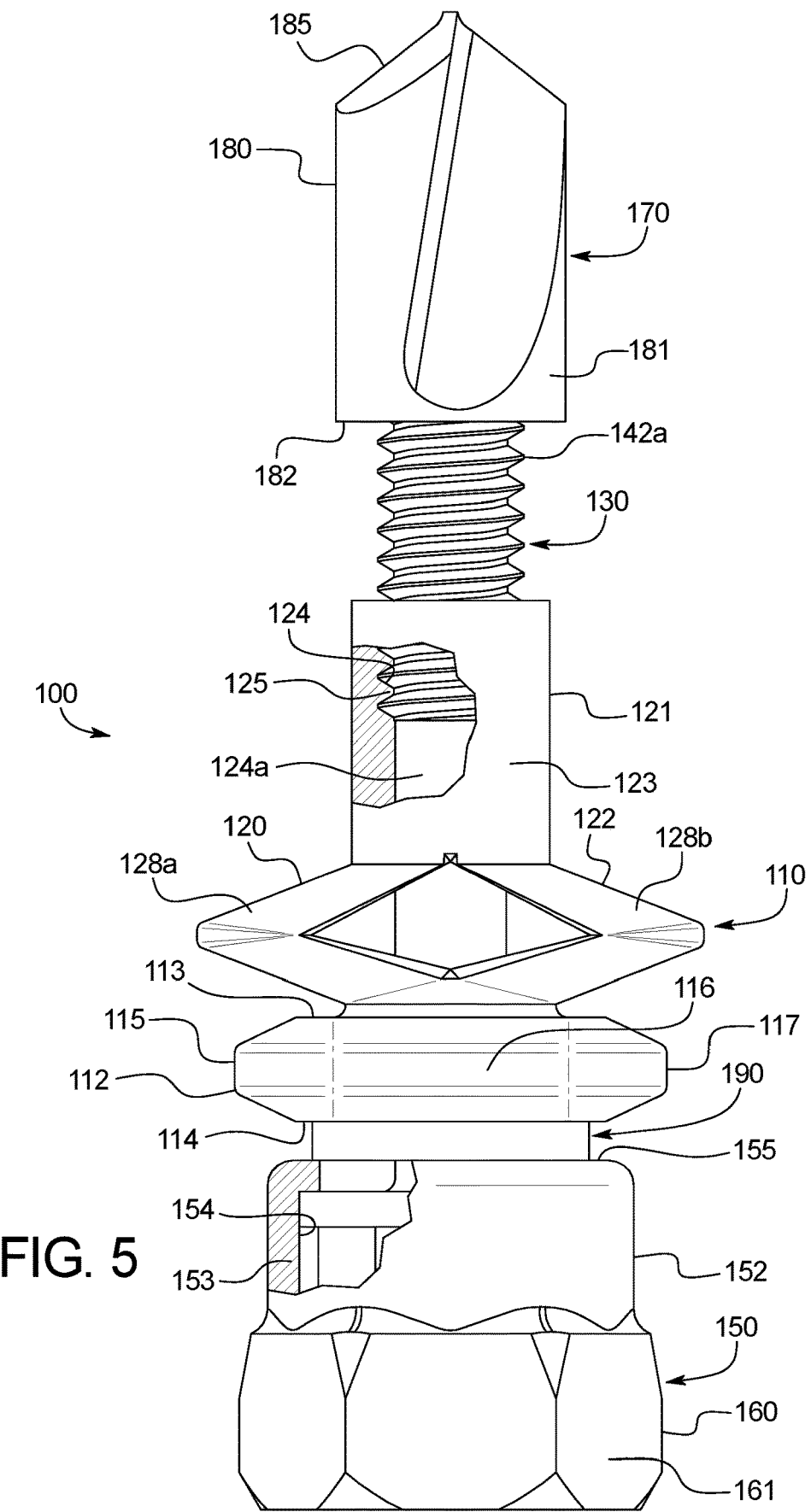
FIG. 5 is an assembled side view of the self-drilling expandable anchor of FIG. 1, with certain portions broken away, and showing the self-drilling expandable anchor with the expansion tube of the expansion member in an expanded position.
Figure 6:
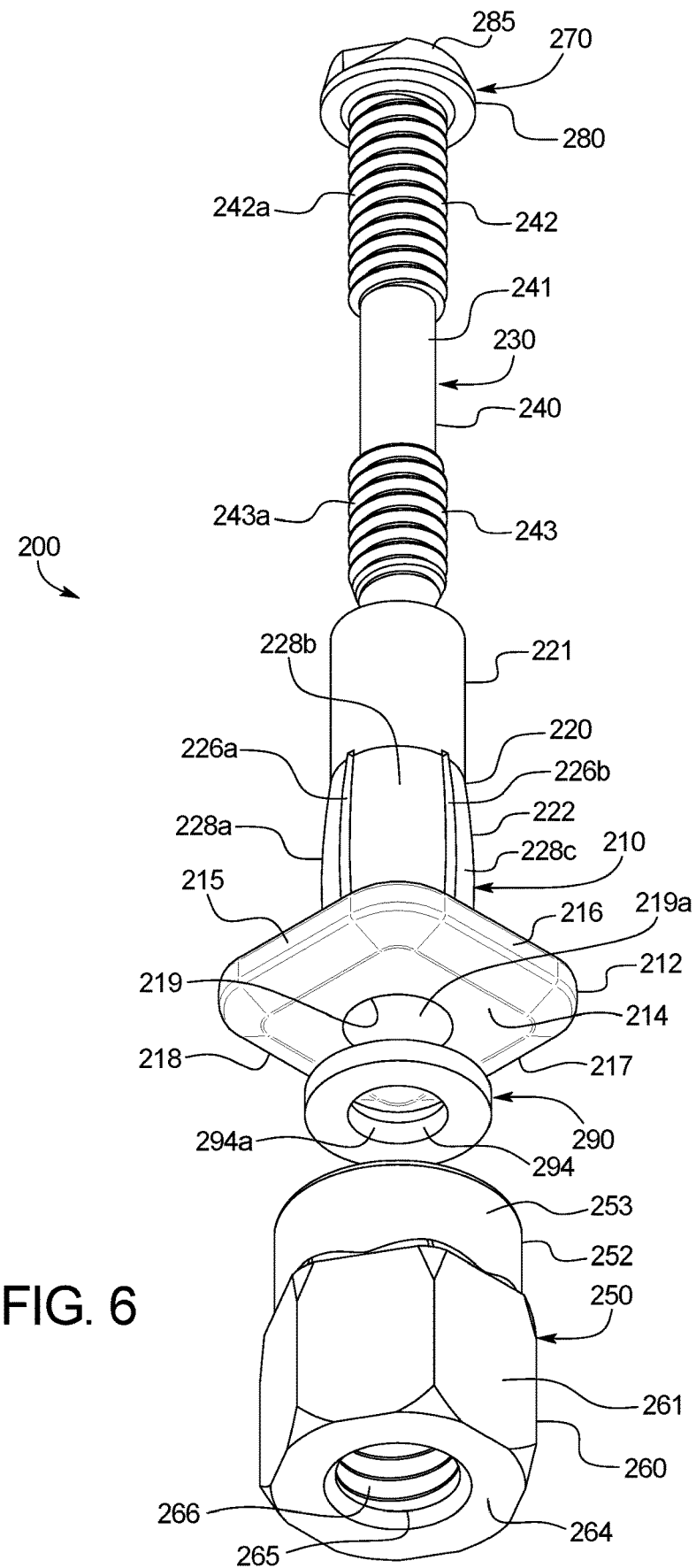
FIG. 6 is an exploded bottom perspective view of a self-drilling expandable anchor of another example embodiment of the present disclosure.
Figure 7:
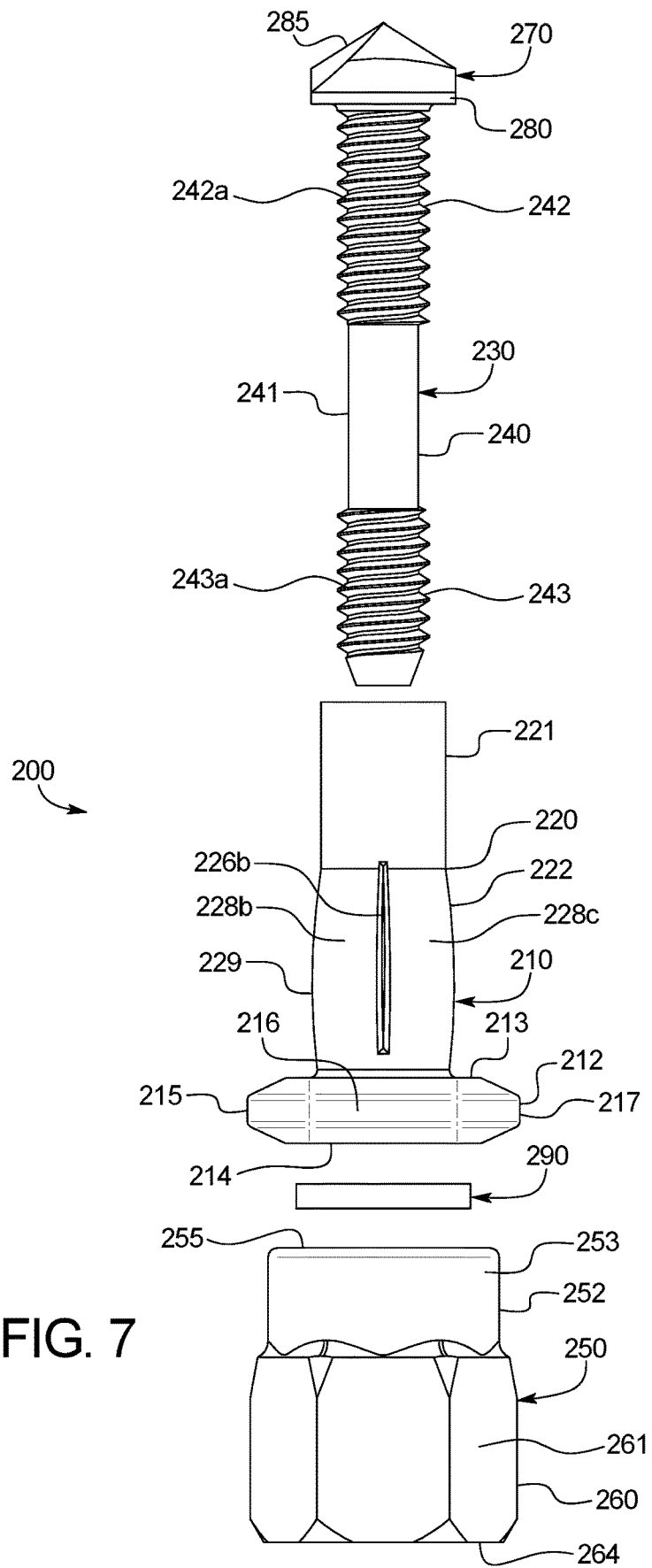
FIG. 7 is an exploded side view of the self-drilling expandable anchor of FIG. 6.

The threaded member connector 152 is configured to securely receive and hold the hex head 132 of the threaded member 130 such that rotation of the hanger 150 causes rotation of the threaded member 130. More specifically, the threaded member connector 152 includes a wall 153 having an outer cylindrical surface (not labeled) and an inner cylindrical surface 154 that defines a stepped hole and that is configured to receive and mate with the edges of the hex head 132 of the threaded member 130 in a press fit manner. As best shown in FIGS. 4 and 5, after the hex head 132 is press fit into the wall 153 of the threaded member connector 152, the upper portion of the wall 153 of the threaded member connector 152 is crimped inwardly to form somewhat of a front ring 155 configured to be engaged by the cylindrical front surface 133 of the hex head 132 of the threaded member 130. After such crimping, the front ring 155 includes an inner surface (not shown) that defines a passageway (not shown) through which the shaft 140 of the threaded member 130 extends. This passageway has a smaller diameter than the outer diameter of the hex head 132. The front ring 155 thus assists in keeping the threaded member 132 in place in the threaded member connector 152. The hanger 150 thus enables the hex head 132 to enter into the threaded member connector 152 and be securely held in the threaded member connector 152.

The hanger base 160 includes a wall 161 having an outer hexagonal surface (not labeled) configured to be engaged by a driver of an installation tool as further described below, a front portion (not labeled) connected to the threaded member connector 152, a back portion (not labeled) also configured to be engaged by a driver of an installation tool as further described below, and an inner surface 165 including or defining inner threads 166 configured to receive a threaded member or rod (not shown) that can be used to hang objects from the anchor assembly 100. It should be appreciated that the hanger base 160 may include or define one or more other features that enable other items to be hung from the hanger 150. For example, the hanger base 160 may define one or more transversely extending openings that enable a member to be inserted through that opening for hanging an item in a different manner.

The drill head 170 that is attachable to the threaded member 130 includes: (a) a connector 180; and (b) a drill tip 185 integrally (such as monolithically) connected to and extending from the connector 180. In various embodiments, the drill head 170 is forged, machined, or milled from a suitable metal (such as steel); although it should be appreciated that the drill head can be made from other suitable materials and in other suitable manners.

The drill head 170 has a slightly larger outer diameter than the outer diameter of the expandable tube 120 of the expandable member 110 such that the drill head 170 can drill a hole in a structure to enable the expandable tube 120 to fit though the drilled hole in the structure as shown in FIGS. 24A, 24B, 24C, 25A, 25B, and 25C, and as further described below. The drill head 170 has a substantially smaller outer diameter than the base 112 of the expandable member 110 such that the base 112 cannot fit through the hole drilled in the structure by the drill head 170 and such that the base 112 can substantially engage an outer surface of the structure as shown in FIGS. 24B, 24C, 24D, 24E, 25B, 25C, 25D, and 25E, and as further described below. In other embodiments, the drill tip can include alternatively arranged cutting surfaces such as a hole saw cutting surface arrangement.

In this illustrated example embodiment, the connector 180 includes a partially cylindrical outer surface 181, a back surface 182, and an inner surface 183 including or defining inner threads 184 configured to receive and engage the outer threads 142a of the shaft 140 of the threaded member 130 for providing a secure connection between the drill head 170 and the shaft 140. The connector 180 includes one or more outer surfaces or edges (not labeled) that enable the connector 180 to form a hole in the structure. Likewise, the drill tip 185 includes one or more surfaces or edges (not labeled) that enable the drill tip 185 to form a hole in the structure. The drill head 170 may include one or more flutes (not labeled) for directing loose material from the structure during the drilling process. The connector and the drill tip may be configured in any suitable manner and may vary based on the type of structure. In other example embodiments of the present disclosure embodiment, the connector 180 is fixedly directly connected to the shaft 140 of the threaded member 130 such as by friction welding, spot welding, chemical bonding, or another suitable method. In such embodiments, the connector 180 does not need to include the inner threads 184. In certain such embodiments, the connector 180 and the shaft 140 have suitable configurations or mating surfaces for facilitating such secure fixed connection.

The friction reducing element 190 is positionable on the threaded member 130 between the hanger 150 and the expandable member 110. The friction reducing element 190 includes a cylindrical ring (such as a washer) with an inner surface 194 that defines a cylindrical passageway (not labeled). The cylindrical passageway is suitably sized such that the shaft 140 (including the threads) of the threaded member 130 can be inserted through the friction reducing element 190 after insertion through the hanger 150 and before insertion into the expandable member 110. In various embodiments, the friction reducing element 190 includes a plastic washer (such as a nylon washer); although it should be appreciated that the friction reducing element can be made from other suitable materials. The friction reducing element 190 reduces friction between the base 112 and the hanger 150. It should also be appreciated that the friction reducing element can additionally or alternatively include a friction reducing coatings on one or more of the base and the hanger.

Figure 3:
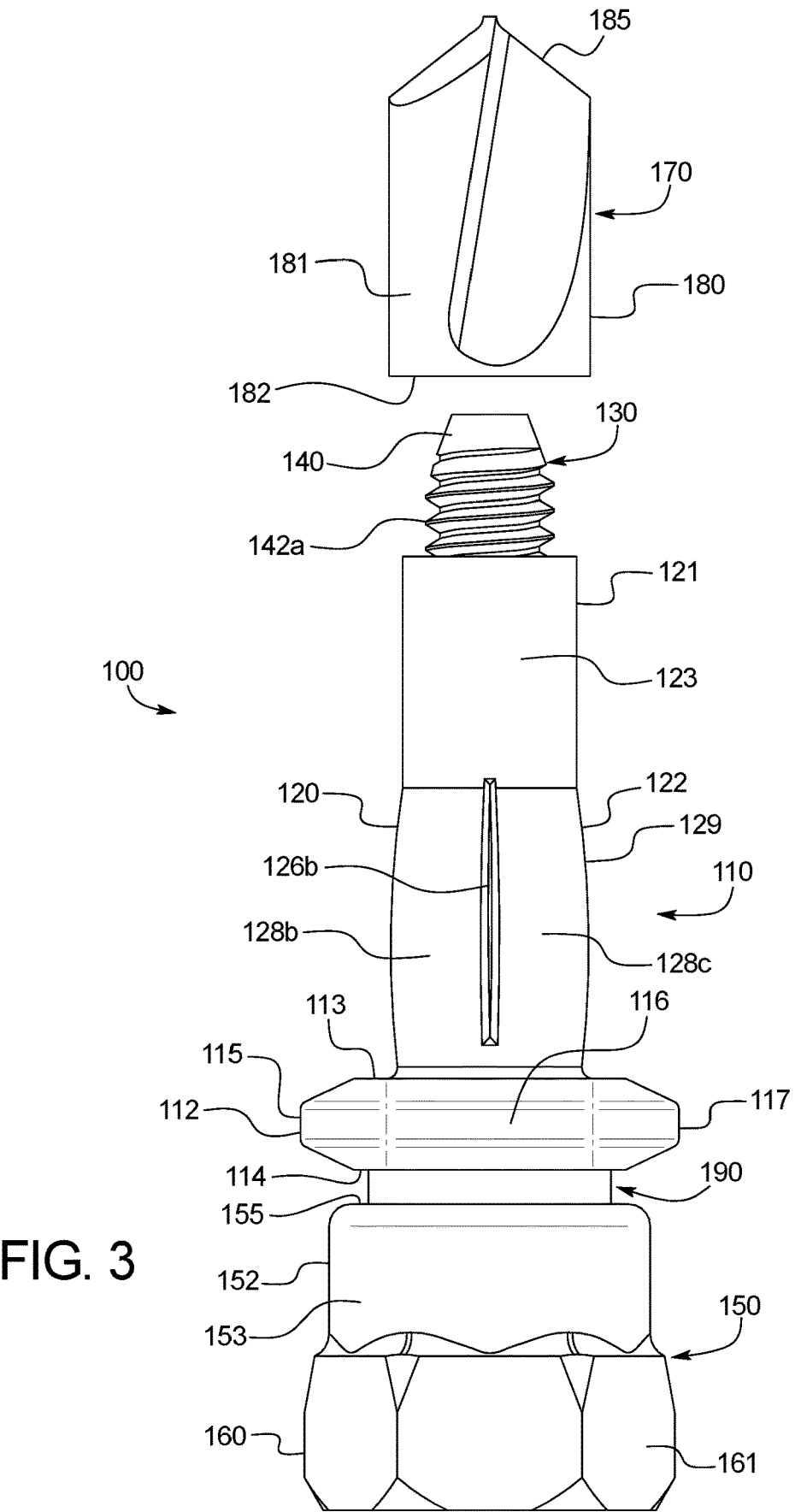
FIG. 3 is a partially assembled and partially exploded side view of the self-drilling expandable anchor of FIG. 1.

This illustrated example self-drilling expandable anchor 100 is generally assembled by inserting the head 132 of the threaded member 130 into the hanger 150, and after the crimping described above, inserting the shaft 140 through the friction reducing element 190, and then through the expandable member 110 as shown in FIG. 3. The drill head 170 is then securely attached to the front end of the threaded member 130, and particularly the connector 180 is attached to the outer threads 142a in this illustrated example embodiment as shown in FIG. 5, or otherwise suitably fixedly connected to the connector 180 of the drill head 170.

Figure 24D:
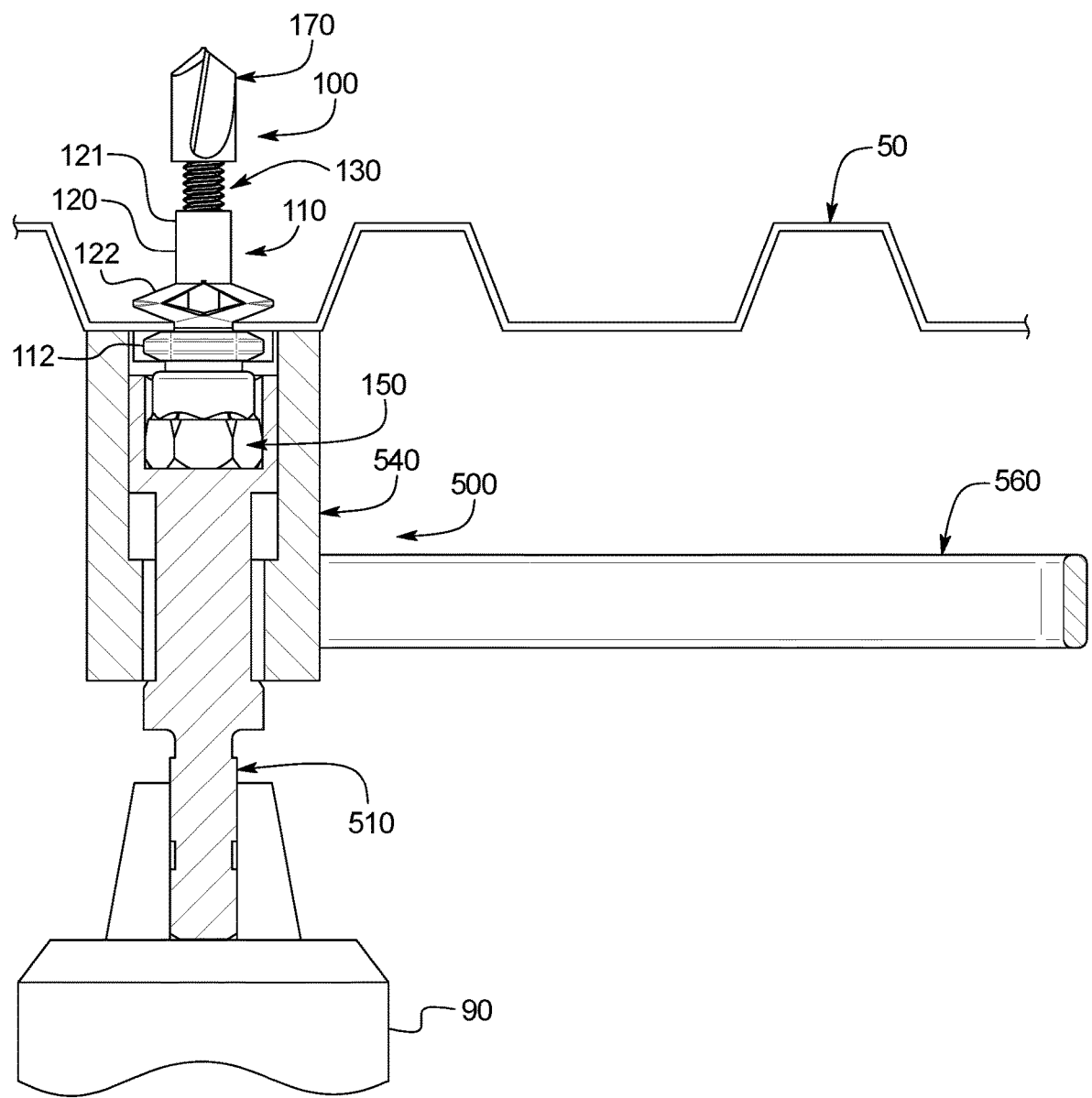
Figure 24E:
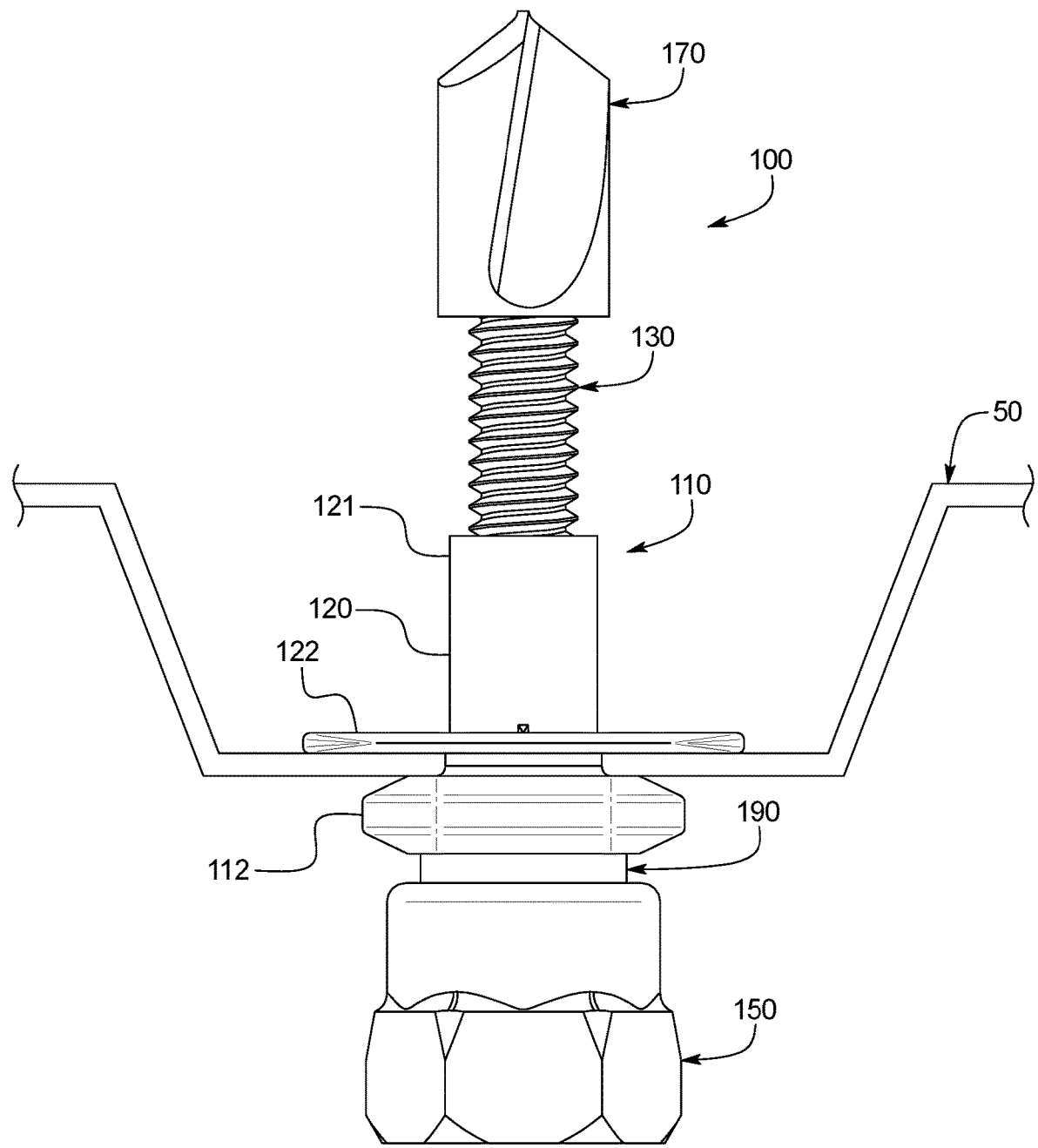
Figure 25A:
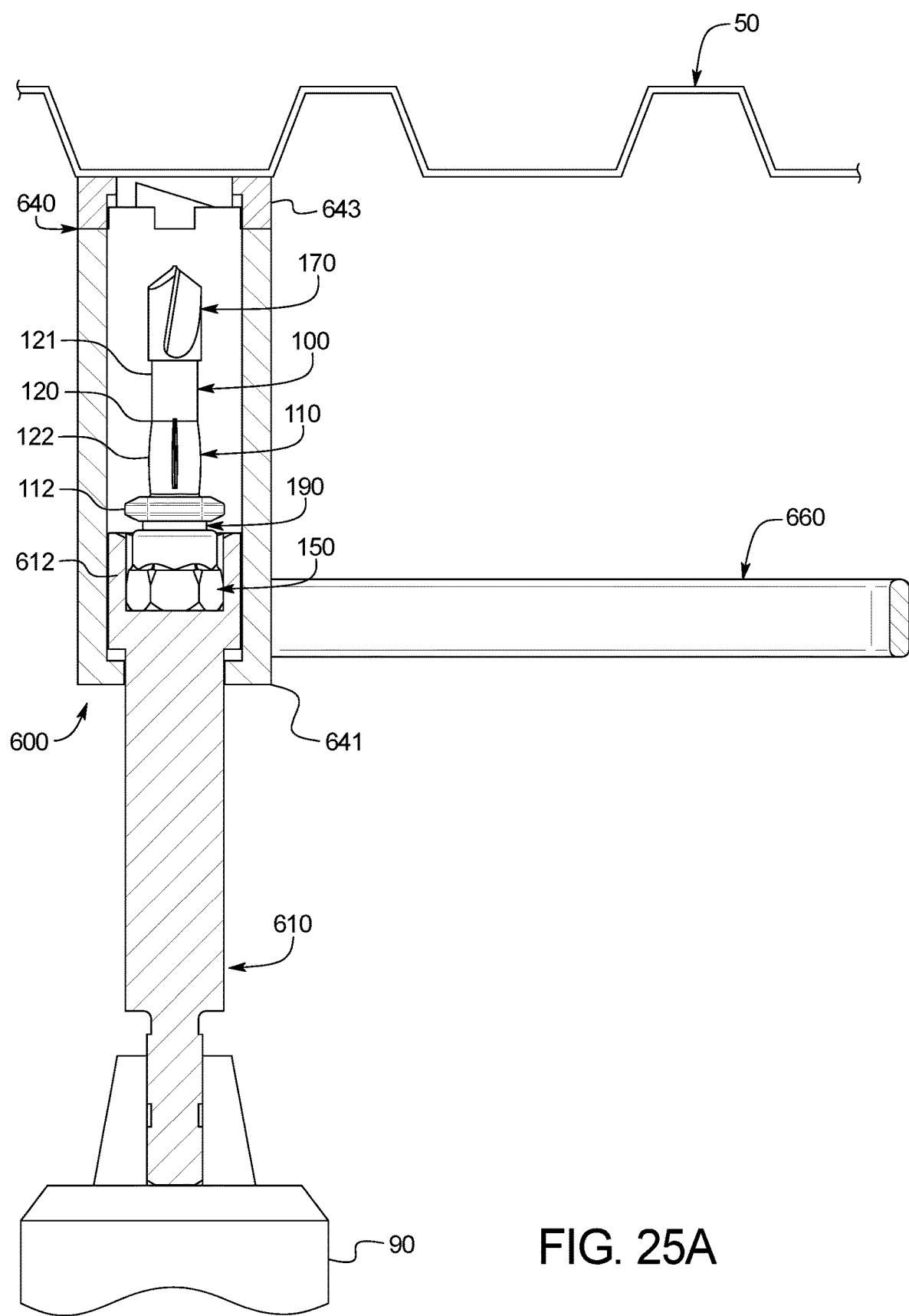
FIGS. 25A, 25B, 25C, 25D, and 25E are a series of partial cross-sectional and partial perspective views showing the method of use and installation of the self-drilling anchor assembly of FIG. 1 into a structure using the self-drilling expandable anchor installation tool of FIG. 17.
Figure 25B:
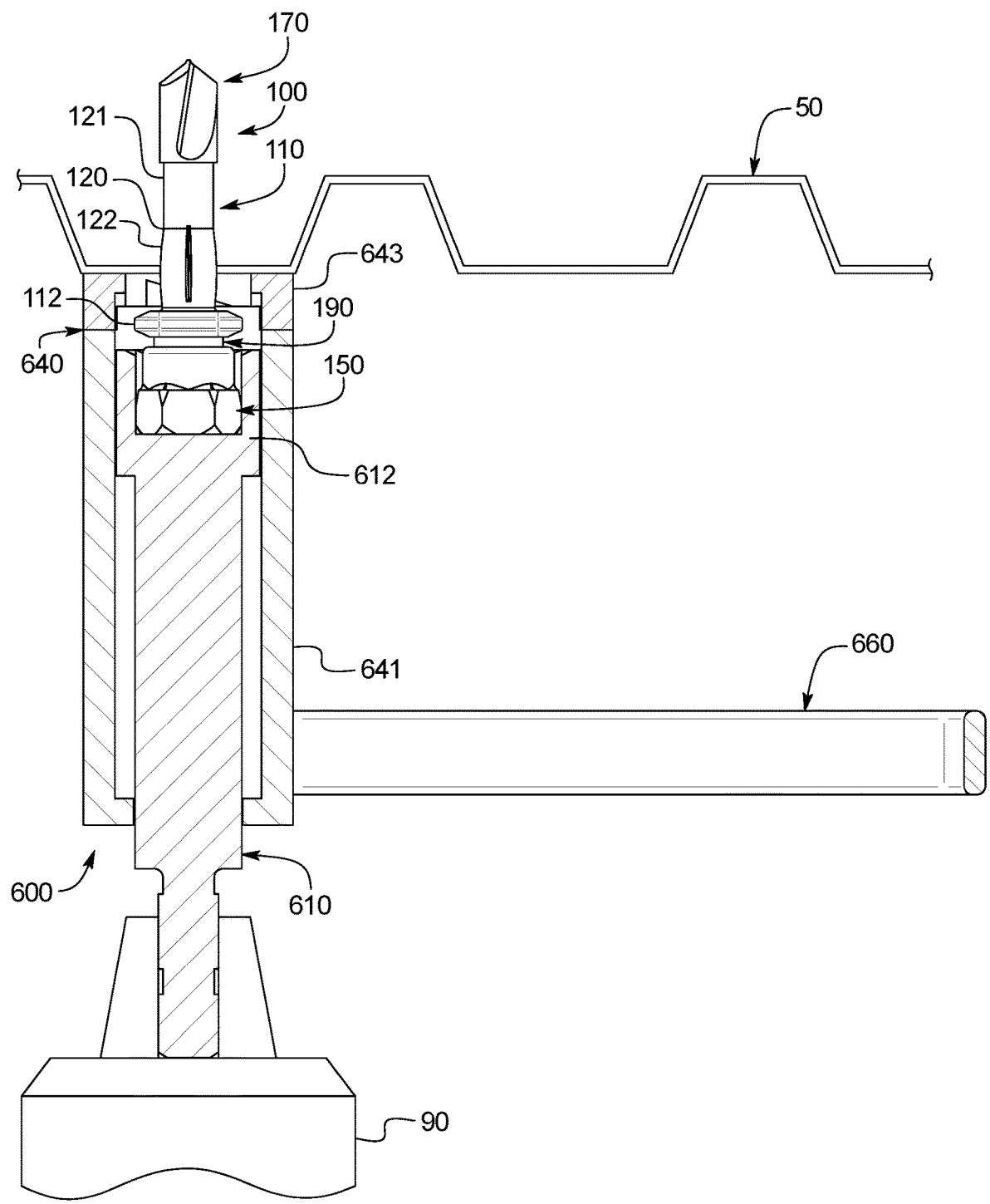
Figure 25C:
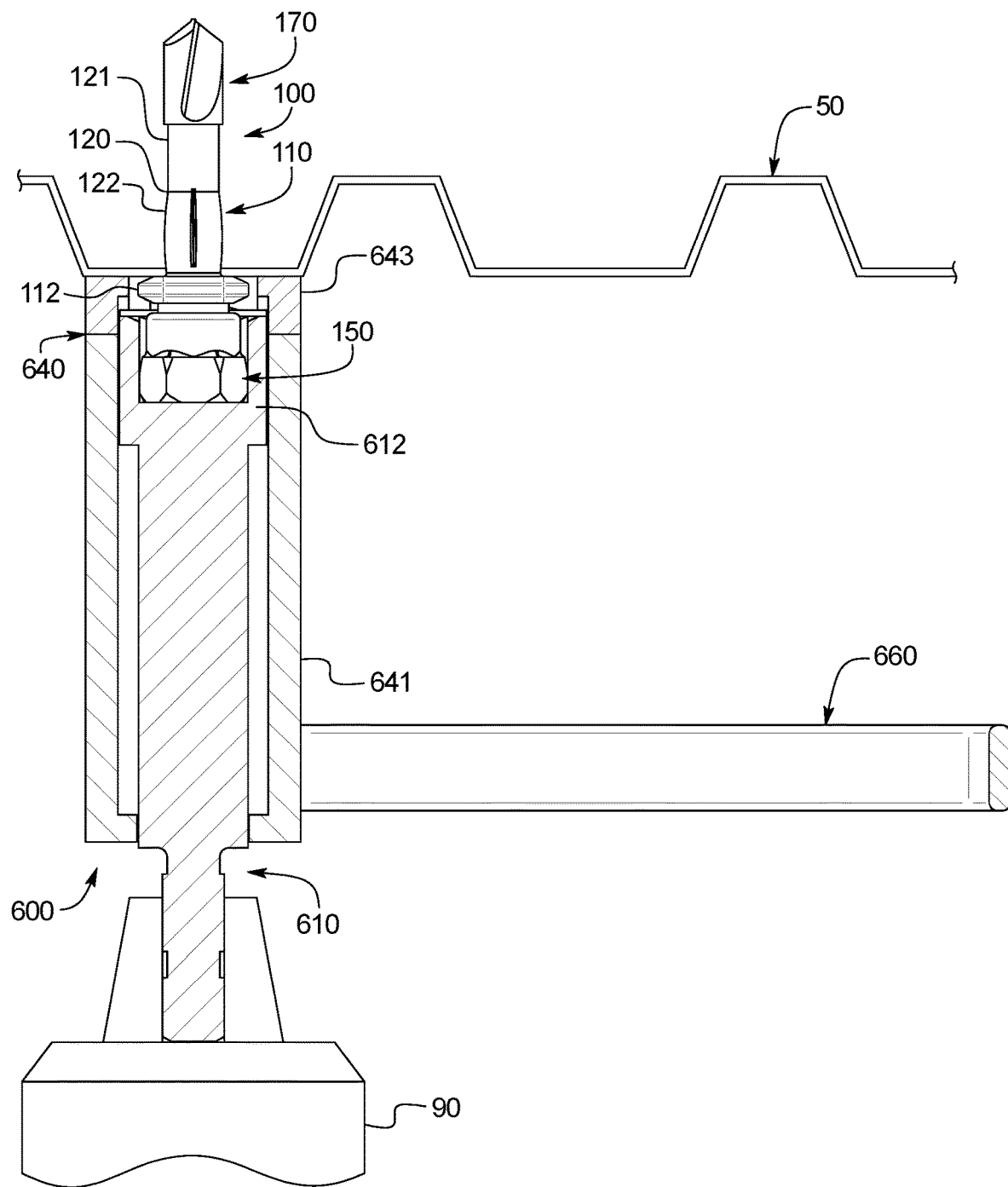
Figure 25D:
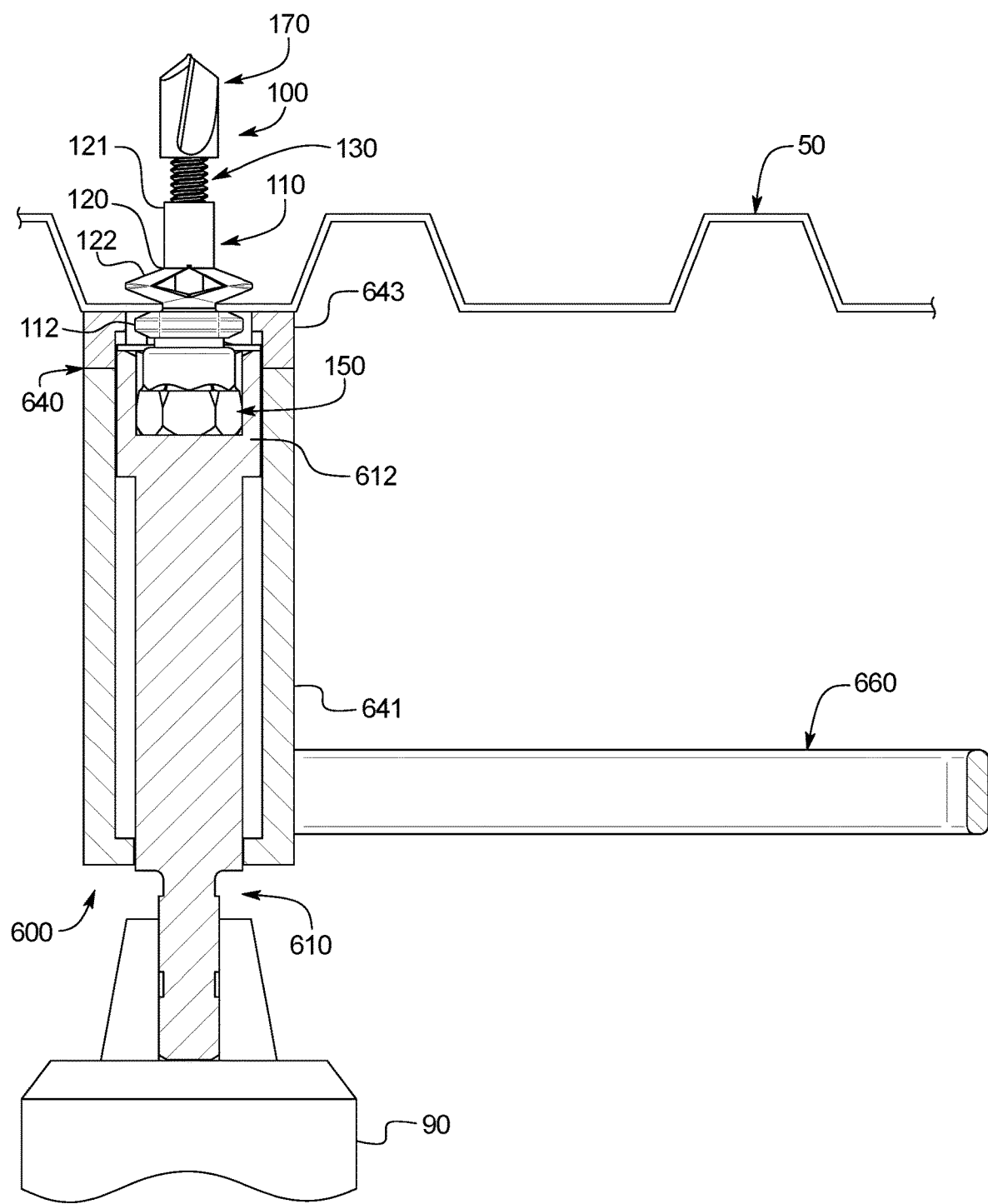
Figure 25E:
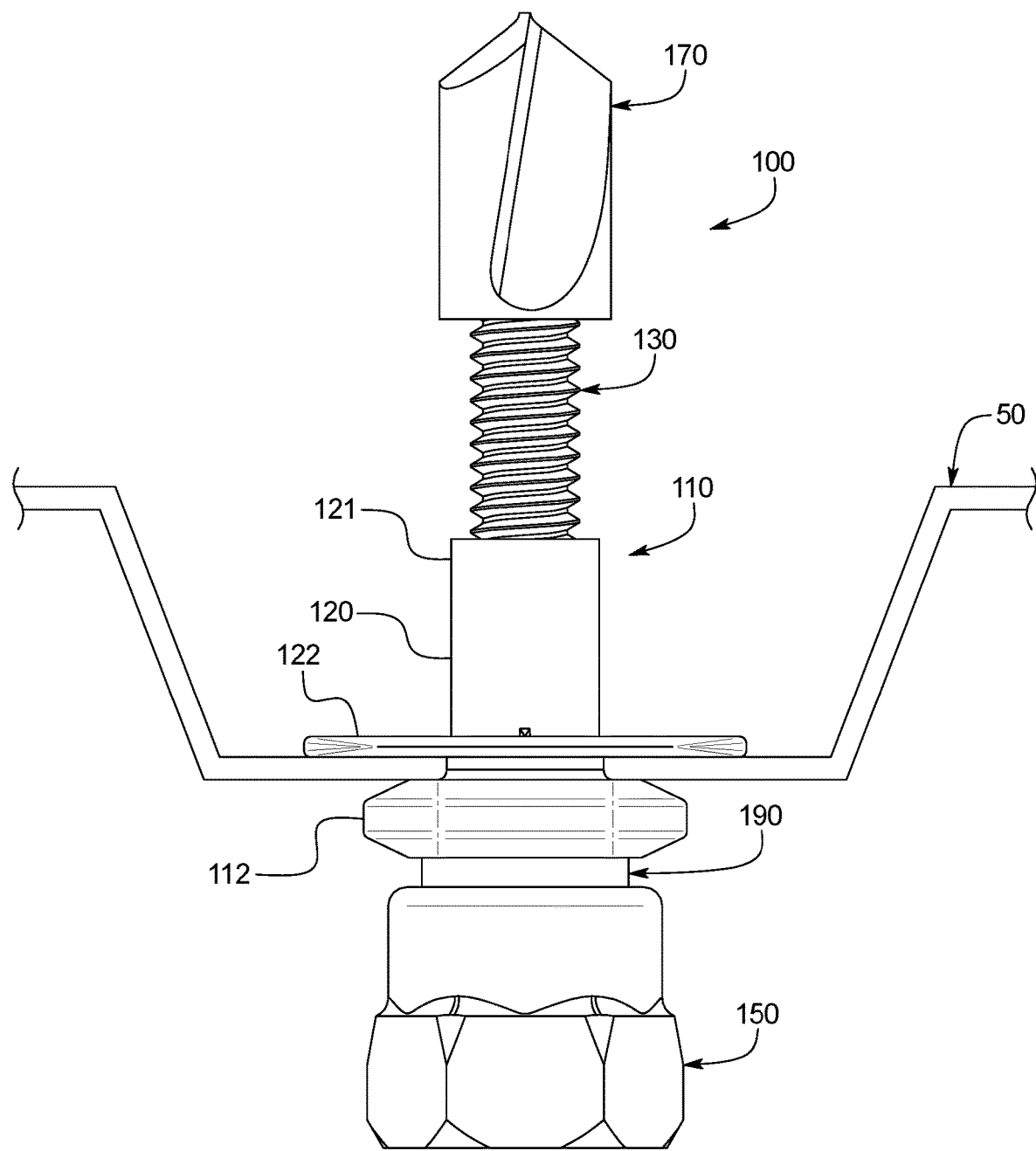

Once assembled, rotation of the hanger 150 will cause rotation of the threaded member 130, rotation of the threaded member 130 will cause rotation of the expandable member 110 (if the base 112 of the expandable member is not held stationary), rotation of the threaded member 130 will cause rotation of the drill head 170, and rotation of the threaded member 130 while the base 112 of the expandable member is held stationary will cause the section 120 of the expandable member 110 to collapse and expand as shown in FIGS. 5, 24D, and 25D. The functioning and operation of the self-drilling expandable anchor 100 is further discussed below.

Referring now to FIGS. 6, 7, 8, 9, and 10, another example embodiment of a self-drilling expandable anchor of the present disclosure, which is generally indicated by numeral 200, is illustrated. This illustrated example self-drilling expandable anchor 200 includes: (1) an expandable member 210; (2) a threaded member 230 configured to extend through and from both ends of the expandable member 210; (3) a hanger 250 attachable to the first or lower end of the threaded member 230; (4) a drill head 270 attached or attachable to the second or upper end of the threaded member 230; and (5) a friction reducing element 290 positionable on the threaded member 230 between the hanger 250 and the expandable member 210.

While threaded member 230, the hanger 250, and the drill head 270 of this illustrated example self-drilling expandable anchor 200 are different than the threaded member 130, the hanger 150, and the drill head 170 of the illustrated example self-drilling expandable anchor 100, this illustrated example self-drilling expandable anchor 200 generally functions for use and installation is a similar manner as the illustrated example self-drilling expandable anchor 100. Generally, the expandable member 210, the threaded member 230, the hanger 250, the drill head 270, and the friction reducing element 290 of the self-drilling expandable anchor 200 are configured such that: (a) a self-drilling expandable anchor installation tool (such as installation tool 500 or installation tool 600 described below) and a drive tool (such as a drill) can be connected to the hanger 250; (b) the installation tool and the drive tool can be employed to rotate the hanger 250, the expandable member 210, the threaded member 230, and the drill head 270 to drill a hole in a structure; (c) the drill head 270, part of the expandable member 210, and part of the threaded member 230 can be inserted through the drilled hole; (d) part of the installation tool can be employed to hold a base 212 of the expandable member 210 stationary while another part of the installation tool can be employed to rotate the hanger 250 and the threaded member 230 to cause part of the expandable member 210 to expand; (e) after the part of the expandable member 210 expands, the base 212 and the expanded part of the expandable member 210 secure the self-drilling expandable anchor 200 to the structure; and (f) an item can be attached to the hanger 250 to hang the item from the structure via the self-drilling expandable anchor 200.

The expandable member 210 is similar or identical to the expandable member 110. More specifically, the expandable member 210 includes: (a) a base 212; and (b) an expandable tube 220 integrally (such as monolithically) connected to and extending from a front surface 213 of the base 212. The base 212 has one or more larger outer dimensions than the expandable tube 220. In this illustrated example, the base 212 has a larger outer width and a larger outer length then that of the expandable tube 220. In this illustrated example embodiment, the base 212 is generally square and the expandable tube 220 is generally cylindrical; although it should be appreciated that this may vary in accordance with the present disclosure. In this illustrated example embodiment, the base 212 and the expandable tube 210 are integrally attached (such as monolithically formed together); although it should be appreciated that this may vary in accordance with the present disclosure. In various embodiments, the expandable member is made from a suitable metal (such as steel); although it should be appreciated that the expandable member can be made from other suitable materials.

The base 210 has the front surface 213, a back surface 214, and four side edges 215, 216, 217, and 218. Each respective side edge 215, 216, 217, and 218 includes two top and bottom opposing inwardly beveled surfaces and an outer surface (not labeled); although this may vary in accordance with the present disclosure. The base 210 has an inner cylindrical surface 219 that defines a cylindrical inner passageway 219a that extends through the base 212 from the back surface 214 to the front surface 213. This inner passageway 219a is aligned with an inner passageway (not labeled) that extends though the expandable tube 220, and thus the entire expandable member 210 defines an inner passageway. In this illustrated example embodiment, the inner cylindrical surface 219 does not have threads. It should be appreciated that although the base is shown as generally square, the base can be any suitable shape (such as an rectangular, octagon, hexagon, or oval) as long as the base has enough purchase area to engage the respective structure and can be held stationary by the respective self-drilling anchor assembly installation tool.

Figure 10:
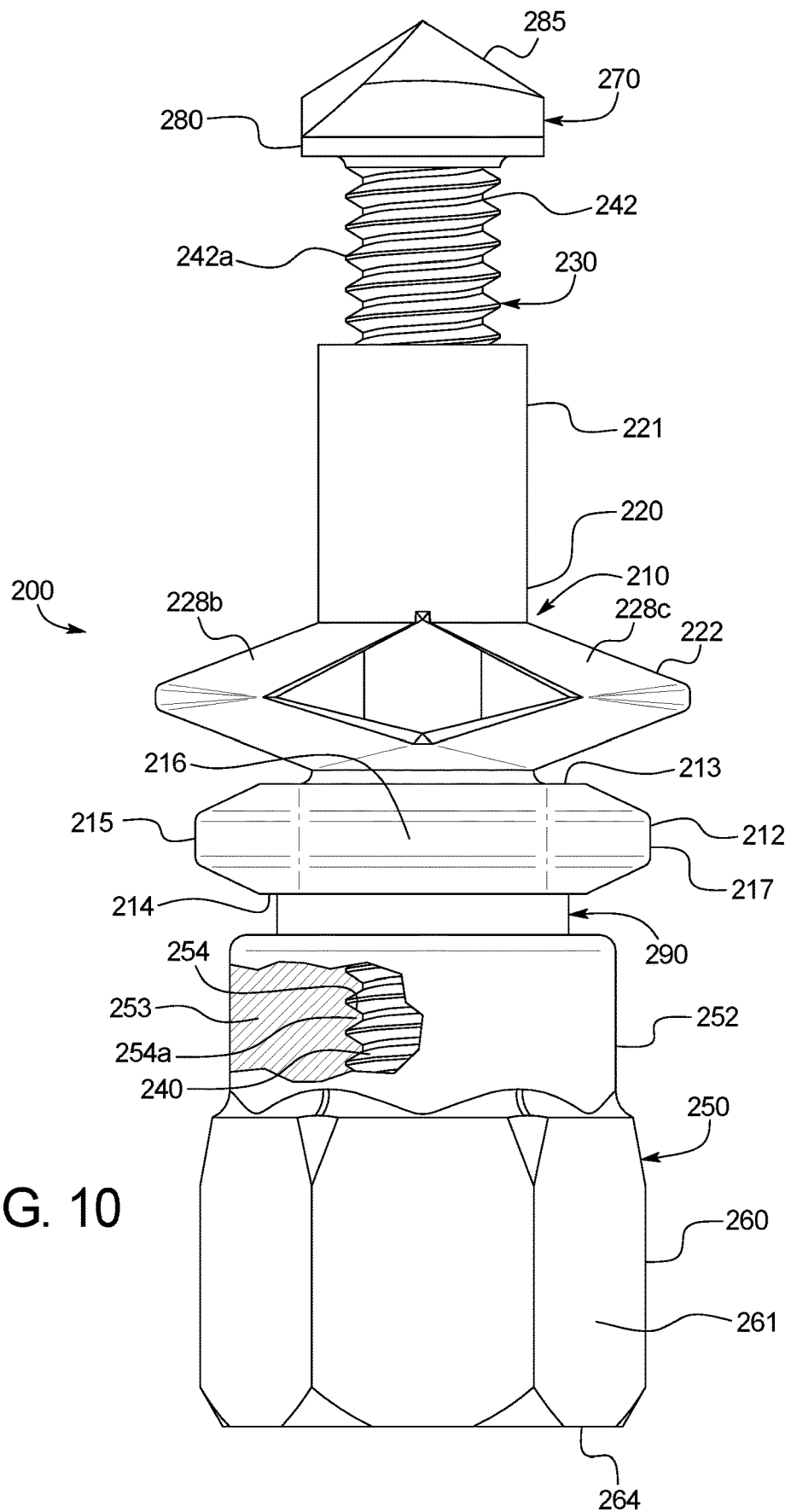
FIG. 10 is an assembled side view of the self-drilling expandable anchor of FIG. 6, with a portion broken away, and showing the self-drilling expandable anchor with the expansion tube of the expansion member in an expanded position.
Figure 11:
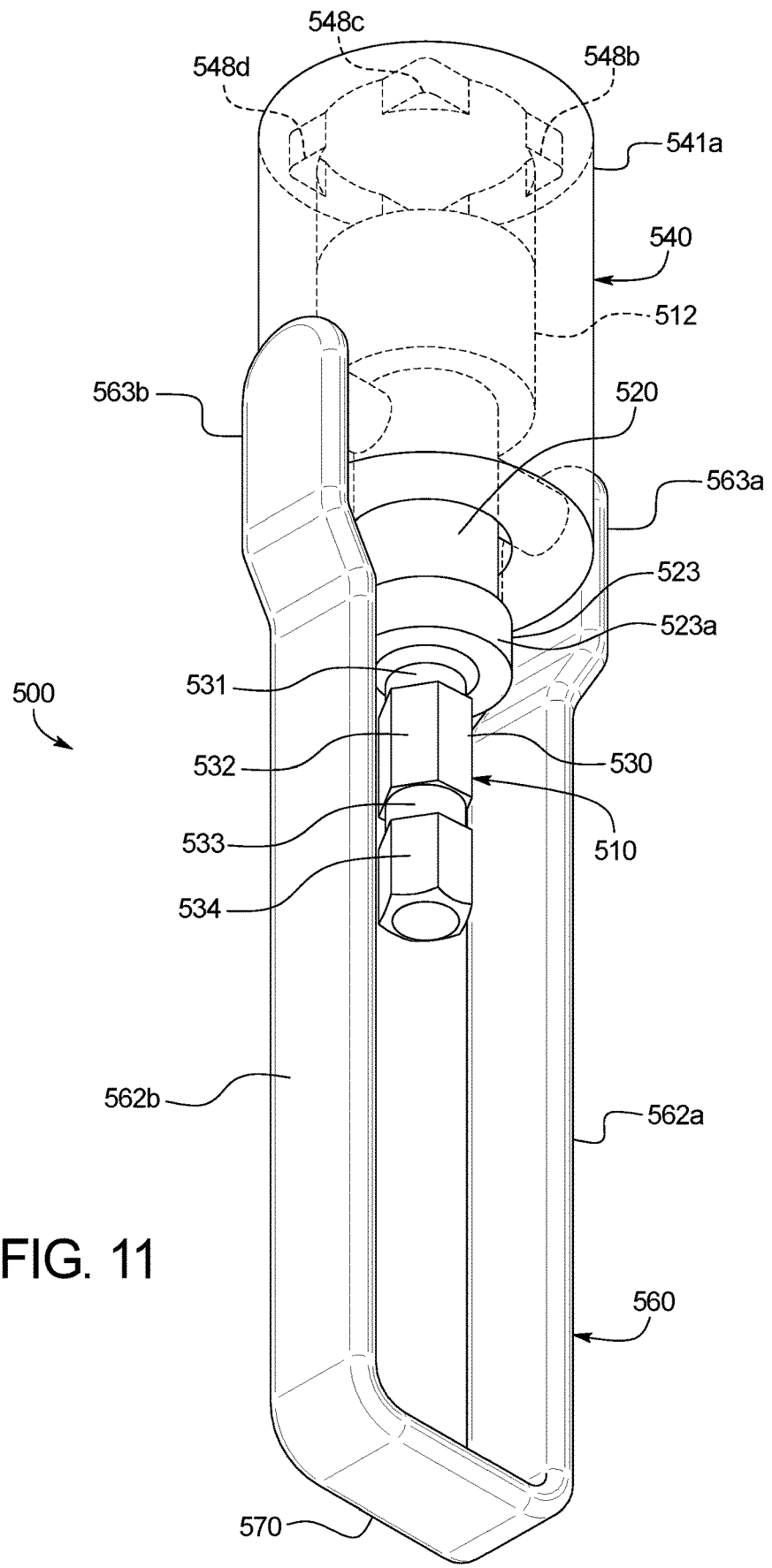
FIG. 11 is an assembled bottom perspective view of a self-drilling expandable anchor installation tool of one example embodiment of the present disclosure, showing certain parts in phantom.
Figure 12:
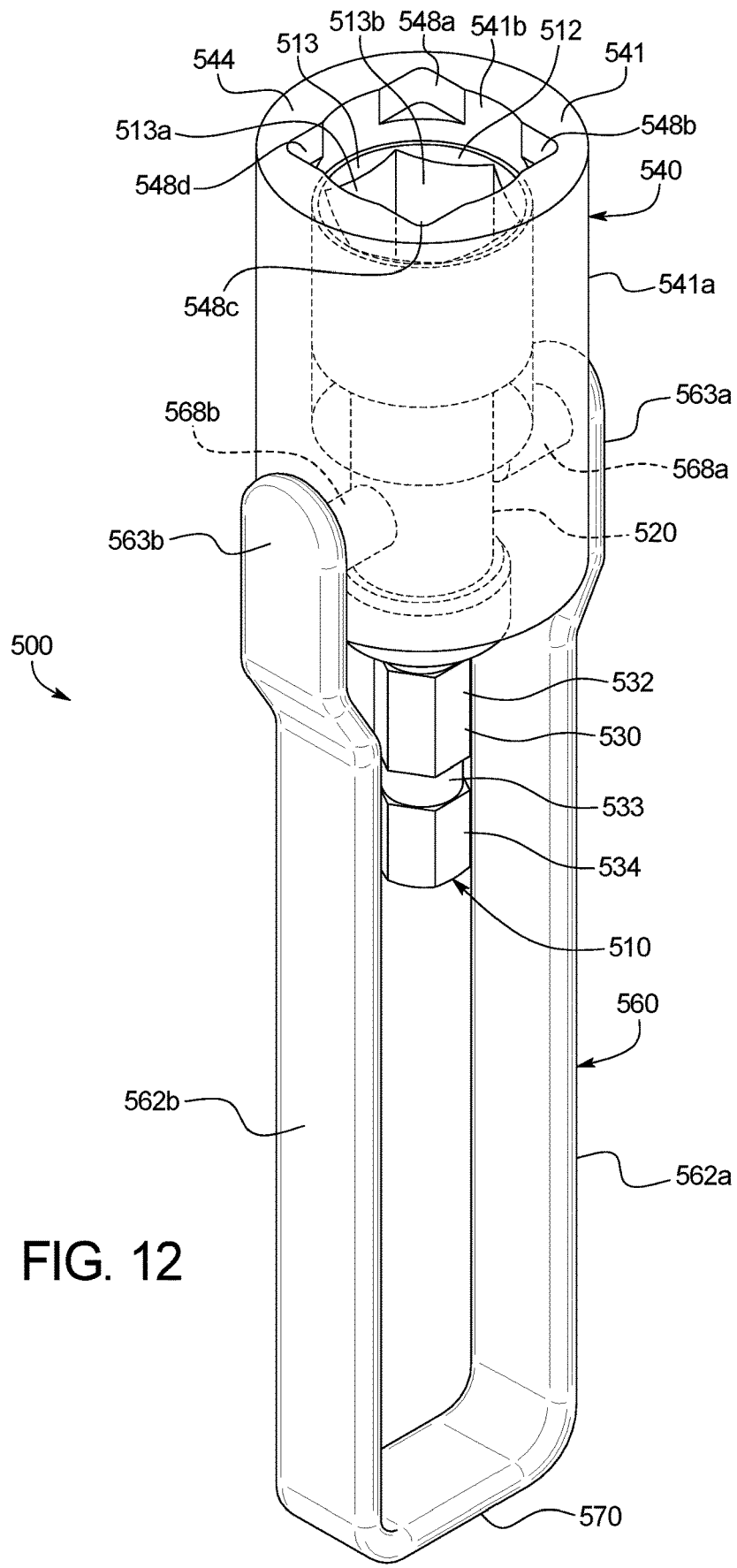
FIG. 12 is an assembled top perspective view of the self-drilling expandable anchor installation tool of FIG. 11, showing certain parts in phantom.
Figure 13:
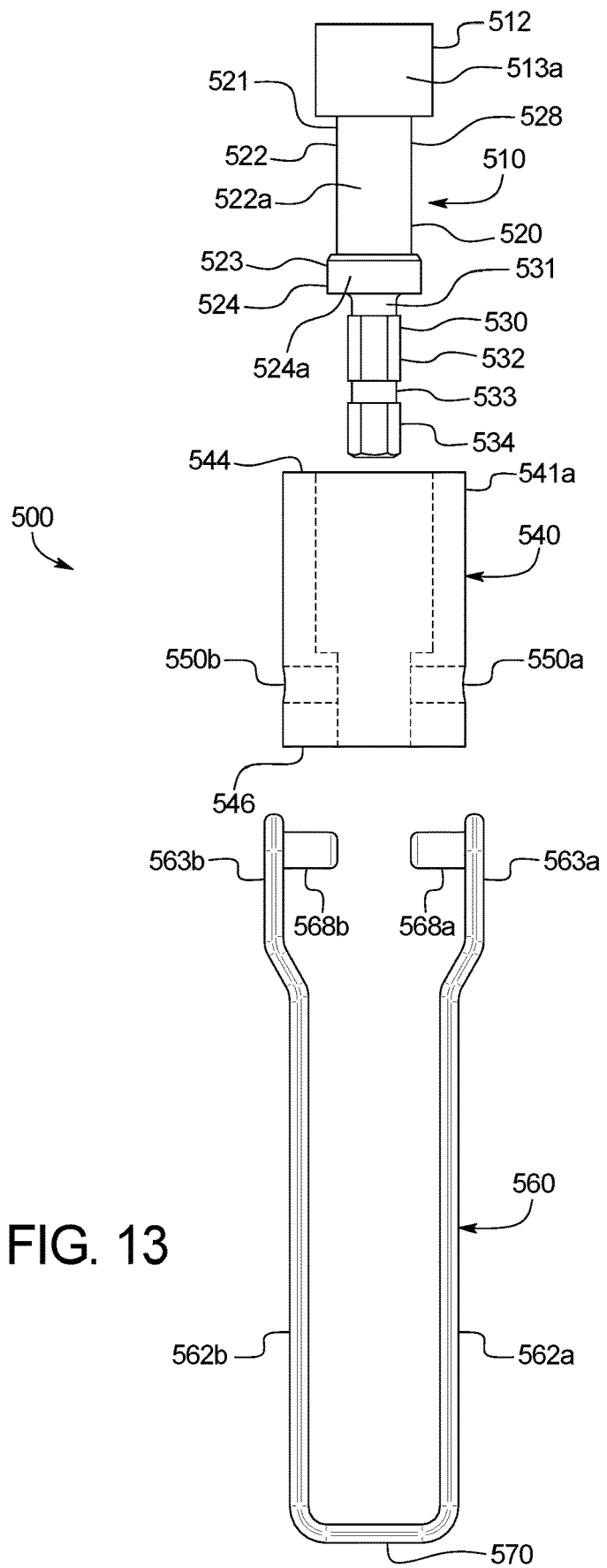
FIG. 13 is an exploded side view of the self-drilling expandable anchor installation tool of FIG. 11.

The expandable tube 220 includes a first or front section 221, a second or back section 222, an outer surface 223, and an inner surface 224. The inner surface 224 of the expandable tube 220 defines an inner passageway (not labeled). Part of the inner surface 224 at the front section 221 has inner threads 225. In this illustrated example embodiment, the rest of the inner surface 224 of the expandable tube 220 does not have threads. The back section 222 of the expandable tube 220 defines a series of longitudinally extending spaced apart slots 226a, 226b, 226c (not shown), and 226d (not shown) around the expandable tube 220. The slots 226a, 226b, 226c, and 226d facilitate the longitudinal collapse and expansion of the back section 222 of the tube expandable 220 as shown in FIG. 10. The expandable tube 220 and the series of longitudinally extending spaced apart slots 226a, 226b, 226c, and 226d facilitate the forming of the outwardly extending anchoring strips 228a, 228b, 228c, and 228d (not shown) when the back section 222 of the expandable tube 220 is longitudinally collapsed and expanded as shown in FIG. 10. The expandable tube 220 is formed with a slight outward bulge 229 to facilitate the collapse and expansion of anchoring strips 228a, 228b, 228c, and 228d. It should be appreciated that the inner threads 225 of the expandable tube 220 enable engagement by the threaded member 230 to facilitate the collapse and expansion of the anchoring strips 228a, 228b, 228c, and 228d. It should be appreciated that although the expandable tube is shown as cylindrical, the expandable tube can be any suitable shape (such as an octagon, hexagon, square, or oval) as long as the expandable tube will fit through the hole drilled in the support and collapse.

The threaded member 230 is different than threaded member 130. This threaded member 230 does not include a hex head like hex head 132. This threaded member 230 is also configured to be inserted into the first or front end of the expandable member 210 for assembly (instead of the second or back end of the expandable member 210). The threaded member 230 includes a partially threaded shaft 240. The shaft 240 has a first section 241 that does not have outer threads, a second section 242 that has outer threads 242a, and a third section 243 that has outer threads 243a. The second section 242 is integrally (such as monolithically) connected to and extends from a first or front end of the first section 241. The third section 243 is integrally (such as monolithically) connected to and extends from a second or back end of the first section 241. The outer threads 242a are configured to engage the inner threads 225 of the expandable tube 220. The outer threads 243a are configured to engage the inner threads of the threaded member connector 252 of the hanger 250, as further described below.

The hanger 250 that is attachable to the threaded member 230 includes: (a) a threaded member connector 252, and (b) a hanger base 260 integrally (such as monolithically) connected to and extending from the threaded member head connector 252. In various embodiments, the hanger 250 is made from a suitable metal (such as steel); although it should be appreciated that the hanger can be made from other suitable materials.

The threaded member connector 252 is shaped and is configured to securely receive the third section 243 of the threaded member 230 such that rotation of the hanger 250 causes rotation of the threaded member 230. More specifically, the threaded member connector 252 includes a wall 253 that has an outer cylindrical surface (not labeled) and an inner surface 254 that includes or defines inner threads 254a configured to threadably receive and mate with the threads 243a of the third section 243 of the threaded member 230, and a front ring 255. The front ring 255 includes an inner cylindrical surface (not shown) and defines a cylindrical passageway (not shown) through which the third section 243 of the shaft 240 of the threaded member 230 can be inserted after insertion of the shaft 240 through the expandable member 210. It should be appreciated that the threaded member 230 can be suitably connected to the threaded member connector 252 in other suitable manners in accordance with the present disclosure.

The hanger base 260 includes a wall 261 having an outer hexagonal surface (not labeled) configured to be engaged by a driver of a suitable installation tool, a front portion (not labeled) connected to the threaded member connector 252, a back surface 264, and an inner surface 265 including or defining inner threads 266 configured to receive and mate with a threaded member or rod (not shown) that can be used to hang objects from the anchor assembly 200. It should be appreciated that the hanger base 260 may include or define one or more other features that enable other items to be hung from the hanger 250. For example, the hanger base 260 may define one or more transversely extending openings that enable a member to be inserted through that opening for hanging an item in a different manner.

The drill head 270 that is fixably attachable to the threaded member 230 includes: (a) a connector 280; and (b) a drill tip 285 integrally (such as monolithically) connected to and extending from the connector 280. In various embodiments, the drill head 270 is forged from a suitable metal (such as steel); although it should be appreciated that the drill head can be made from other suitable materials and in other suitable manners.

The drill head 270 has a slightly larger outer diameter than the expandable tube 220 of the expandable member 210 such that the drill head 270 can drill a hole in a structure to enable the expandable tube 220 to fit though the drilled hole in that structure. The drill head 270 has a substantially smaller outer diameter than the base 212 of the expandable member 210 such that the base 212 cannot fit through the drilled hole in the structure and such that it will substantially engage an outer surface of that structure. In other embodiments, the drill tip can include alternatively arranged cutting surfaces such as a hole saw cutting surface arrangement.

The connector 280 is configured to be securely directly connected to the front end of the shaft 240 of the threaded member 230. In this illustrated example embodiment, the connector 280 and the shaft 240 of the threaded member 230 are monolithically formed as one component. In other example embodiments, the shaft 240 is friction welded, spot welded, chemically bonded, or otherwise fixedly connected to the front end of the shaft 240 of the threaded member 230 to form the secure connection between the drill head 270 and the shaft 240. In other example embodiments, the connector 280 may include inner threads configured to receive and engage the outer threads 242a of the shaft 240 of the threaded member 230 for providing a secure connection between the drill head 270 and the shaft 240.

The connector 280 includes one or more outer surfaces or edges (not labeled) that enable the connector 280 to form a hole in the structure. Likewise, the drill tip 285 includes one or more surfaces or edges (not labeled) that enable the drill tip 285 to form a hole in the structure. The connector and the drill tip may include one or more flutes (not labeled) for directing loose material from the structure during the drilling process. The connector and the drill tip may be configured in any suitable manner and may vary based on the type of structure.

The friction reducing element 290 that is positionable on the threaded member 230 between the hanger 250 and the expandable member 210. The friction reducing element 290 includes a cylindrical ring (such as a washer) with an inner surface 294 that defines a cylindrical passageway 294a. The cylindrical passageway 294a is suitably sized such that the shaft 240 (including the threads thereon) of the threaded member 230 can be inserted through the friction reducing element 290 after insertion through the expandable member 210. In various embodiments, the friction reducing element 290 includes a plastic washer (such as a nylon washer); although it should be appreciated that the friction reducing element can be made from other suitable materials. The friction reducing element 290 reduces friction between the base 212 and the hanger 250. It should also be appreciated that the friction reducing element can additionally or alternatively include a friction reducing coatings on one or more of the base and the hanger.

Figure 8:
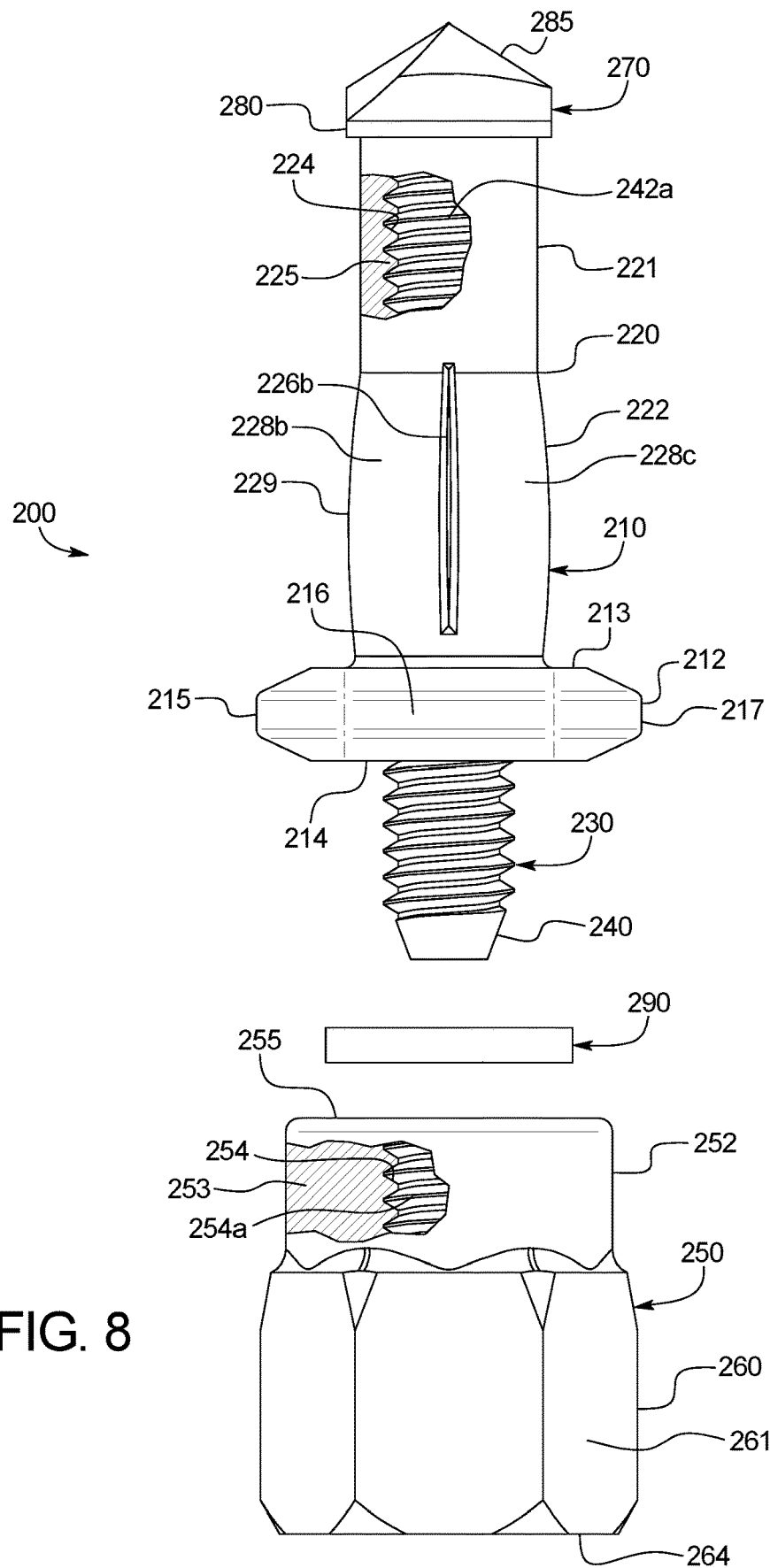
FIG. 8 is a partially assembled and partially exploded side view of the self-drilling expandable anchor of FIG. 6, with certain portions broken away.
Figure 9:
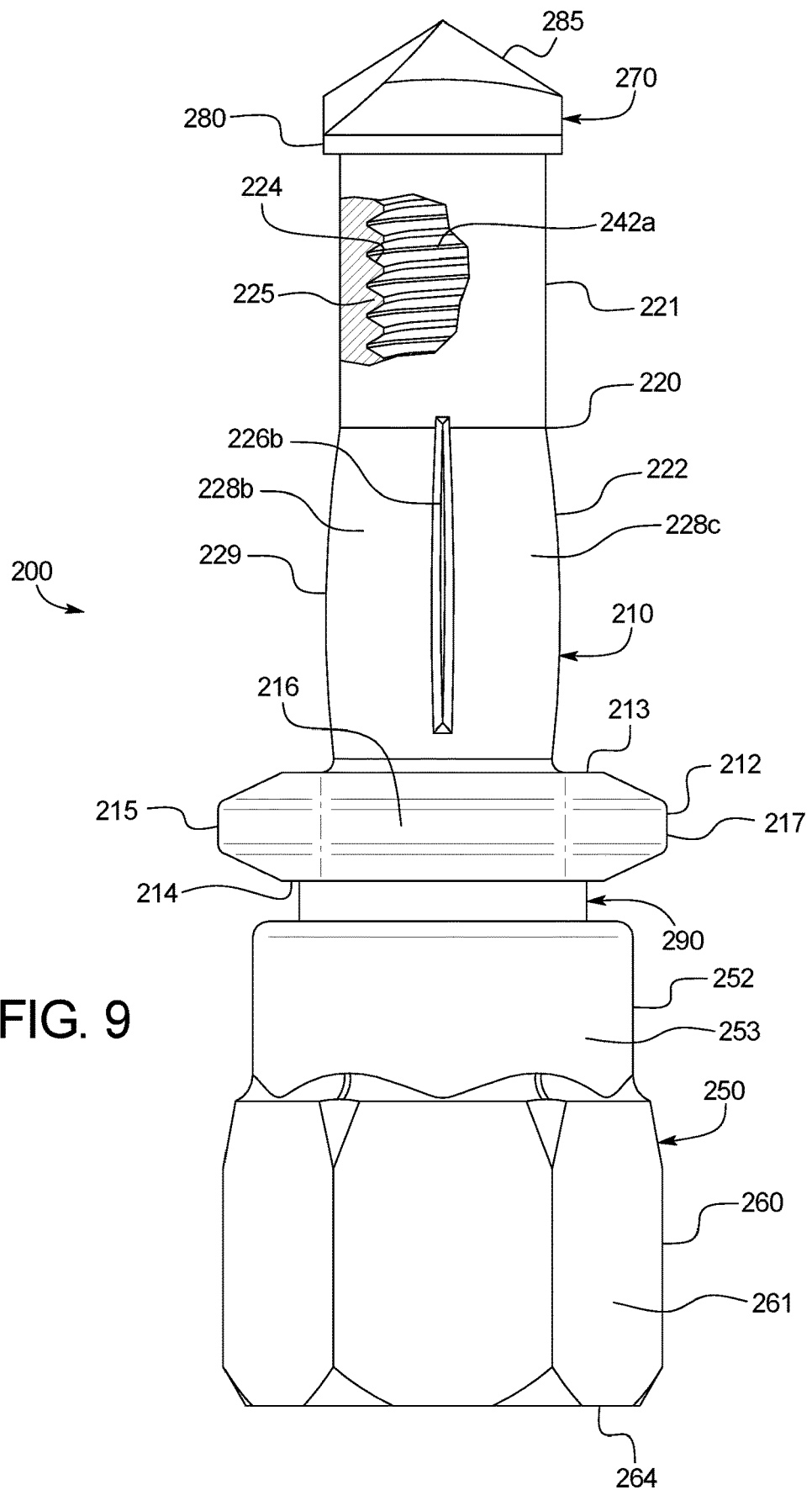
FIG. 9 is a fully assembled side view of the self-drilling expandable anchor of FIG. 6, with a portion broken away.

This illustrated example self-drilling expandable anchor 200 is generally assembled by inserting the threaded member 230 through the first or front end of the expandable member 210 and then through the friction reducing element 290 as shown in FIG. 8. The back end of the threaded member 210 is then threadably attached to the threaded member connector 252 of the hanger 250 as shown in FIG. 9.

Once assembled, rotation of the hanger 250 will cause rotation of the threaded member 230, rotation of the threaded member 230 will cause rotation of the expandable member 210 (if the base 212 of the expandable member is not held stationary), rotation of the threaded member 230 will cause rotation of the drill head 270, and rotation of the threaded member 230 while the base 212 of the expandable member is held stationary will cause the section 220 of the expandable member 210 to collapse and expand as shown in FIG. 10. Thus, after assembly, the functioning and operation of the self-drilling expandable anchor 210 is substantially the same as the functioning and operation of the self-drilling expandable anchor assembly 110 and is thus not further discussed herein for brevity.

Referring now to FIGS. 11, 12, 13, 14, 14, 16, 24A, 24B, 24C, and 24D, an example embodiment of a self-drilling expandable anchor installation tool of the present disclosure, which is generally indicated by numeral 500, is illustrated. This illustrated example self-drilling expandable anchor installation tool 500 includes: (1) a driver 510; (2) an expandable member engagement sleeve 540 movably mounted on the driver 510; and (3) a handle 560 pivotally connected to the expandable member engagement sleeve 540. The self-drilling expandable anchor installation tool 500 is described herein with respect to the engagement with and the installation of the self-drilling expandable anchor 100 for brevity; however, it should be appreciated that the self-drilling expandable anchor installation tool 500 can be employed for engagement with and the installation of the self-drilling expandable anchor 200, or for engagement with and the installation of another suitable self-drilling expandable anchor in accordance with the present disclosure.

Generally, the driver 510, the expandable member engagement sleeve 540, and the handle 560 of the installation tool 500 are configured such that: (a) the driver 510 and a drive tool (such as a drill) can be connected to the hanger 150 of the self-drilling expandable anchor 100; (b) the installation tool 500 and the drive tool can be employed to rotate the hanger 150, the expandable member 110, the threaded member 130, and the drill head 170 of the self-drilling expandable anchor 100 to drill a hole in a structure; (c) the installation tool 500 can be employed to insert the drill head 170, part of the expandable member 110, and part of the threaded member 130 through the drilled hole; (d) the expandable member engagement sleeve 540 and the handle 560 can then be employed to engage and hold the base 112 of the expandable member 110 stationary while the driver 510 can be employed to rotate the hanger 150 and the threaded member 130 to cause part of the expandable member 110 to expand; and (e) after that part of the expandable member 110 expands such that the base 112 and that expanded part of the expandable member 110 secure the self-drilling expandable anchor 100 to the structure, the installation tool 500 can be detached from the self-drilling expandable anchor 100.

More specifically, the driver 510 is configured to engage and turn the threaded member 130 of the self-drilling expandable anchor 100 and thus turn the drill head 170 as further described below. The driver 510 includes: (a) a hanger base socket 512; (b) a sleeve pivot pin receiver 520 integrally (such as monolithically) connected to and extending from the hanger base socket 512; and (c) a drive tool engager 530 integrally (such as monolithically) connected to and extending from the sleeve pivot pin receiver 520. In various embodiments, the driver 510 is made from a suitable metal (such as steel); although it should be appreciated that the driver 510 can be made from other suitable materials.

The hanger base socket 512 includes a wall 513 having a cylindrical outer surface 513*a* and a hexagonal inner surface 513*b* configured to receive and mate with the hanger base 160 of the self-drilling expandable anchor 100 such that rotation of the driver 510 including the hanger base socket 512 causes rotation of the threaded member 160 of the self-drilling expandable anchor 100. It should be appreciated that the inner surface 513*b* and the hanger base 160 can have co-acting alternatively configured or shaped surfaces (such as but not limited to a twelve point socket configuration).

The sleeve pivot pin receiver 520 includes: (1) a first section 521 including a generally cylindrical solid member 522 having a cylindrical outer surface 522*a*; and (2) a second section 523 including a generally cylindrical solid member 524 having a cylindrical outer surface 524*a*. The first section 521 has a smaller outer diameter than the second section 523 and a smaller outer diameter than that of the hanger base socket 512 such that the first section 521, the second section 523, and the hanger base socket 512 define a pivot pin receipt area 528 surrounding the first section 521. The pivot pin receipt area 528 enables the pivot pins 568*a* and 568*b* (described below) to move longitudinally in the pivot pin receipt area 528 between the hanger base socket 512 and the second section 523 so that the expandable member engagement sleeve 540 and the handle 560 are longitudinally moveable relative to the driver 510. The pivot pin receipt area 528 also enables the pivot pins 568*a* and 568*b* to move radially about the first section 521 in the pivot pin receipt area 528 between the hanger base socket 512 and the second section 523 so that the expandable member engagement sleeve 540 and the handle 560 are radially moveable relative to and around the driver 510.

The drive tool engager 530 has a solid body including a first section 531, a second section 532 integrally (such as monolithically) connected to and extending from first section 531, a third section 533 integrally (such as monolithically) connected to and extending from second section 532, and a fourth section 534 integrally (such as monolithically) connected to and extending from the third section 533. One or more of these sections are configured to mate with a drive tool (such as a drill 90 partially shown in FIGS. 24A, 24B, 24C, 24D, 25A, 25B, 25C, and 25D) or an extension (not shown) connected to a drive tool (such as a drill) in a conventional manner, as further described below, to cause the drive tool engager 530 to rotate.

The expandable member engagement sleeve 540 includes a wall 541 having a generally cylindrical outer surface 541*a* and a stepped inner surface 541*b* with two different inner diameters. The expandable member engagement sleeve 540 and the inner surface 541*b* has a first section that defines a first inner diameter and a first interior passageway (not labeled) that is larger than: (1) the outer diameter of each part of the driver 510 including the hanger base socket 512; and (2) the outer dimensions of the base 112 of the expandable member 110 of the self-drilling expandable anchor 100. The expandable member engagement sleeve 540 and the inner surface 541*b* has a second section that defines a small second inner diameter and a second interior passageway (not labeled) that is smaller than: (1) the outer diameter of each part of the hanger base socket 512; and (2) the outer dimensions of the base 112 of the expandable member 110 of the self-drilling expandable anchor 100. This configuration provides an interior section of the expandable member engagement sleeve 540 that is positioned in the pivot pin receipt area 528 to limit the longitudinal movement of sleeve 540 relative to the driver 510.

The expandable member engagement sleeve 540 and the wall 541 have a front end 544 and a back end 546. The expandable member engagement sleeve 540 and particularly the front end 544 of the wall 541 defines four interior base receiving pockets 548*a*, 548*b*, 548*c*, and 548*d* that are configured to respectively receive and hold the four corners of the base 112 of the expandable member 110 of the self-drilling expandable anchor 100 when the expandable member engagement sleeve 540 is moved forward on and relative to the driver 510 into engagement with the base 112. It should be appreciated that these co-acting configured or shaped surfaces can be alternatively formed (such as but not limited to a six or eight point configuration). Specifically this engagement with the corners of the base 112 of the expandable member 110 of the self-drilling expandable anchor 100 occurs when the expandable member engagement sleeve 540 is moved forward (by the installer) on and relative to the driver 510 into engagement with the base 112 to hold the base stationary, as shown in FIGS. 24C and 24D. The engagement of the expandable member engagement sleeve 540 with the base 112 of the expandable member 110 of the self-drilling expandable anchor 100 enables the expandable member engagement sleeve 540 to hold the base 112 in place without spinning after the expandable member 110 is inserted partially through the structure 50 and the installer desires to collapse and expand the strips 128*a*, 128*b*, 128*c*, and 128*d* of the expandable tube 120, as further described below. In this illustrated example embodiment, each of the interior base receiving pockets 548*a*, 548*b*, 548*c*, and 548*d* is defined by three walls (not labeled) that are formed in the cylindrical wall 541 of the expandable member engagement sleeve 540. These three walls (e.g., the bottom wall and two side walls) that define each pocket are sized to engage the rear surface 114 or a respective one of the side edges 115, 116, 117, and 118 of the respective corner of the base 112.

The expandable member engagement sleeve 540 and specifically the wall 541 also defines two opposing pivot pin openings 550*a* and 550*b* near the back end 546 of the expandable member engagement sleeve 540 for respectively receiving the pivot pins 568a and 568b.

Figure 14:
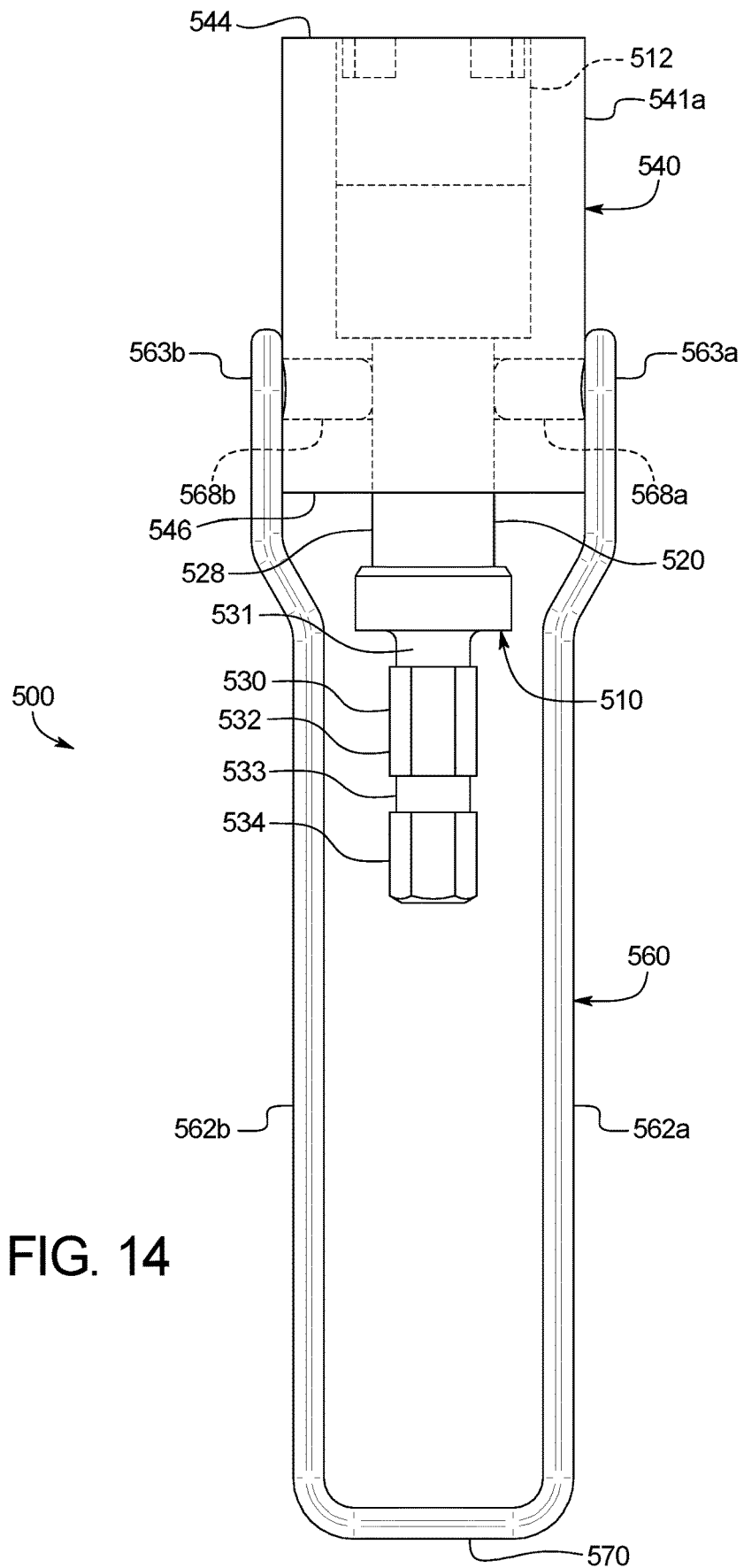
FIG. 14 is an assembled side view of the self-drilling expandable anchor installation tool of FIG. 11, showing certain parts in phantom.
Figure 15:
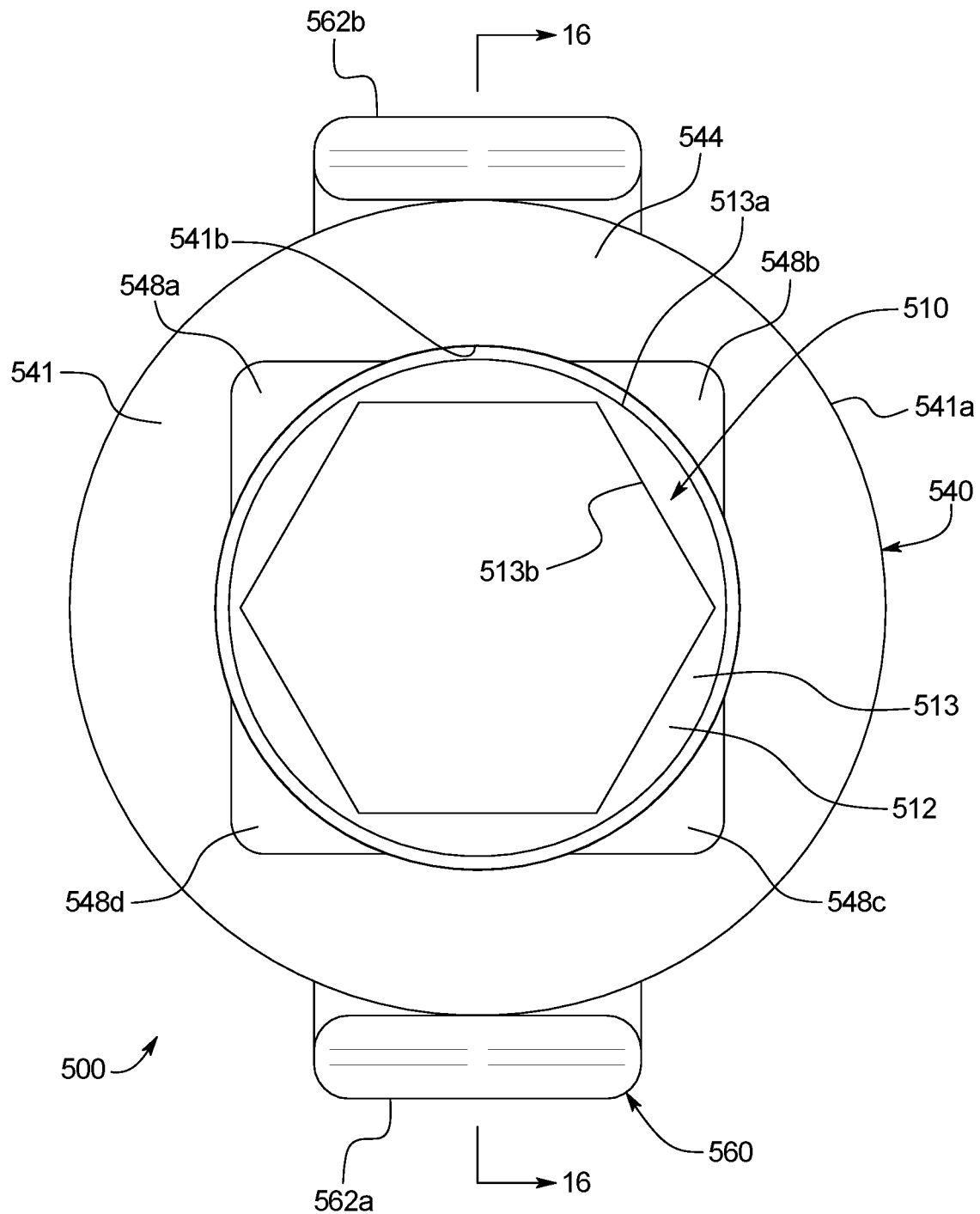
FIG. 15 is a front end view of the self-drilling expandable anchor installation tool of FIG. 11.
Figure 16:
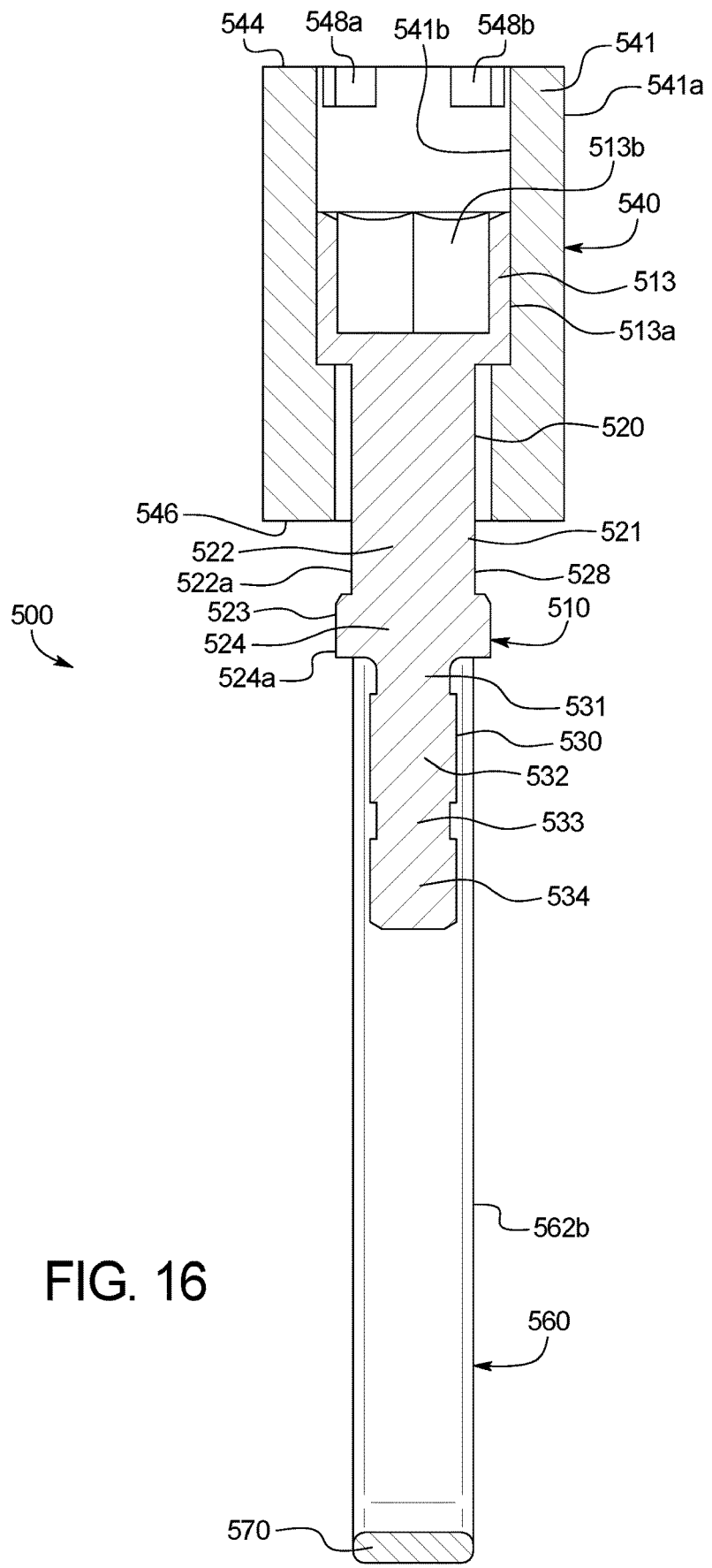
FIG. 16 is a cross-sectional view of the self-drilling expandable anchor installation tool of FIG. 11, taken substantially along line 16-16 of FIG. 15.
Figure 17:
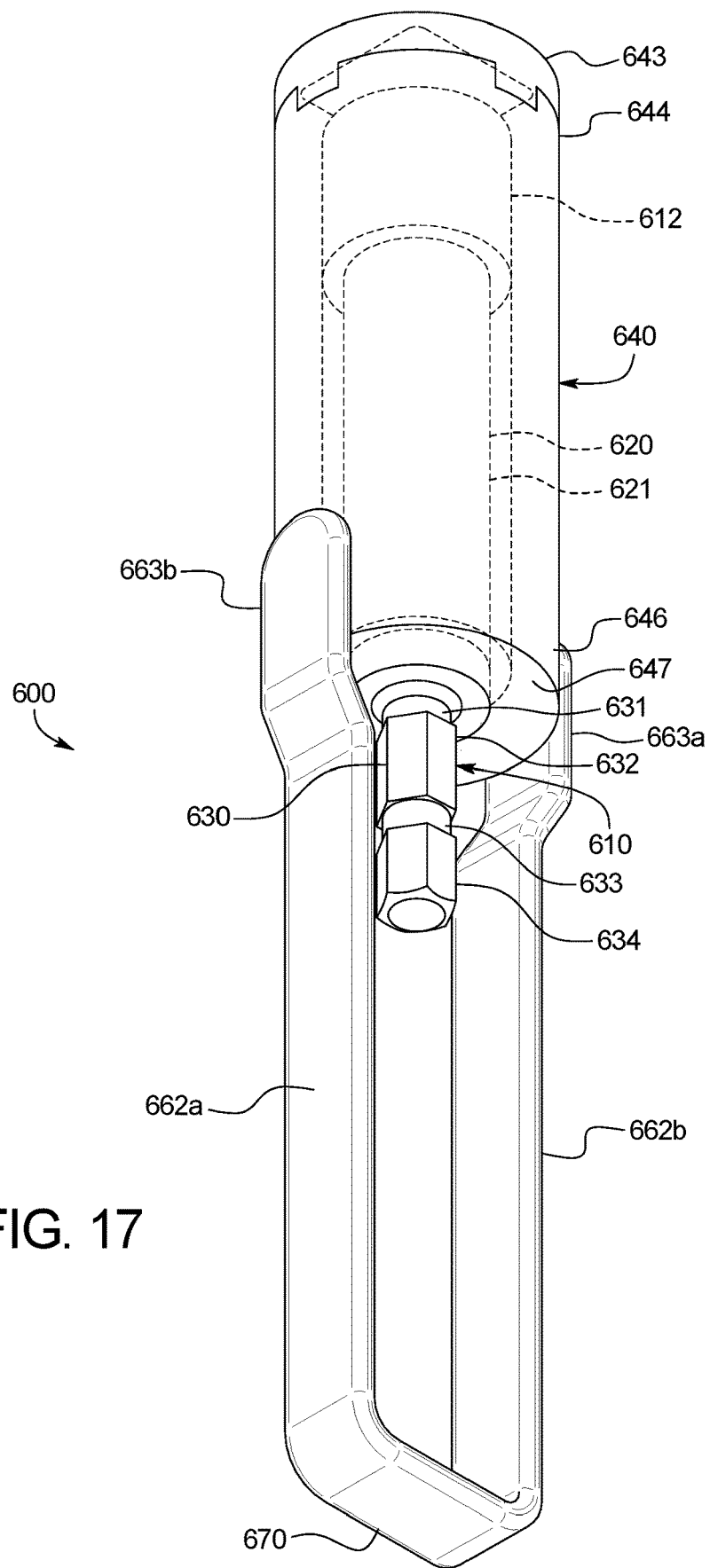
FIG. 17 is an assembled bottom perspective view of a self-drilling expandable anchor installation tool of another example embodiment of the present disclosure, showing certain parts in phantom.
Figure 18:
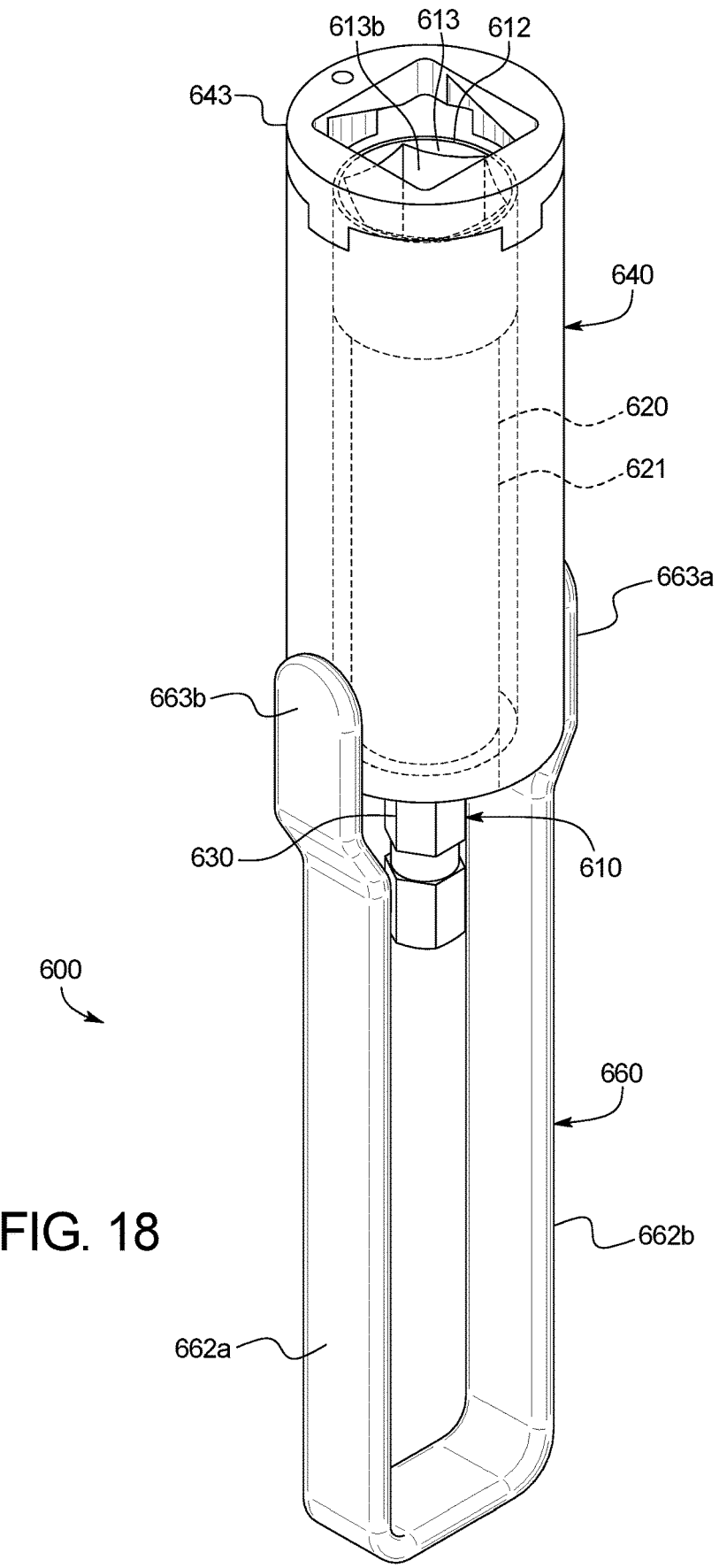
FIG. 18 is an assembled top perspective view of the self-drilling expandable anchor installation tool of FIG. 17, showing certain parts in phantom.
Figure 19:
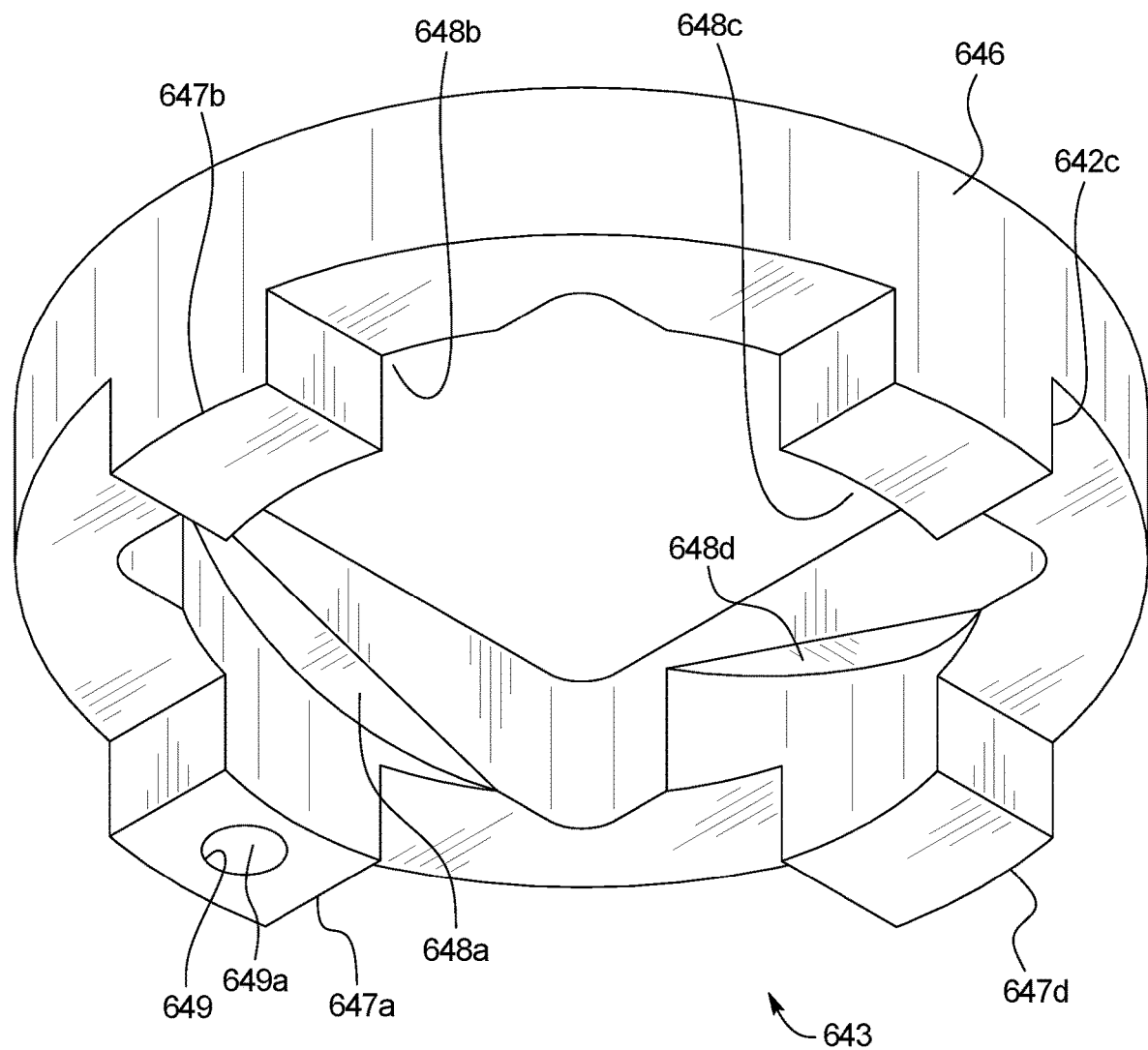
FIG. 19 is an bottom perspective view of the base engager of the self-drilling expandable anchor installation tool of FIG. 17.
Figure 20:
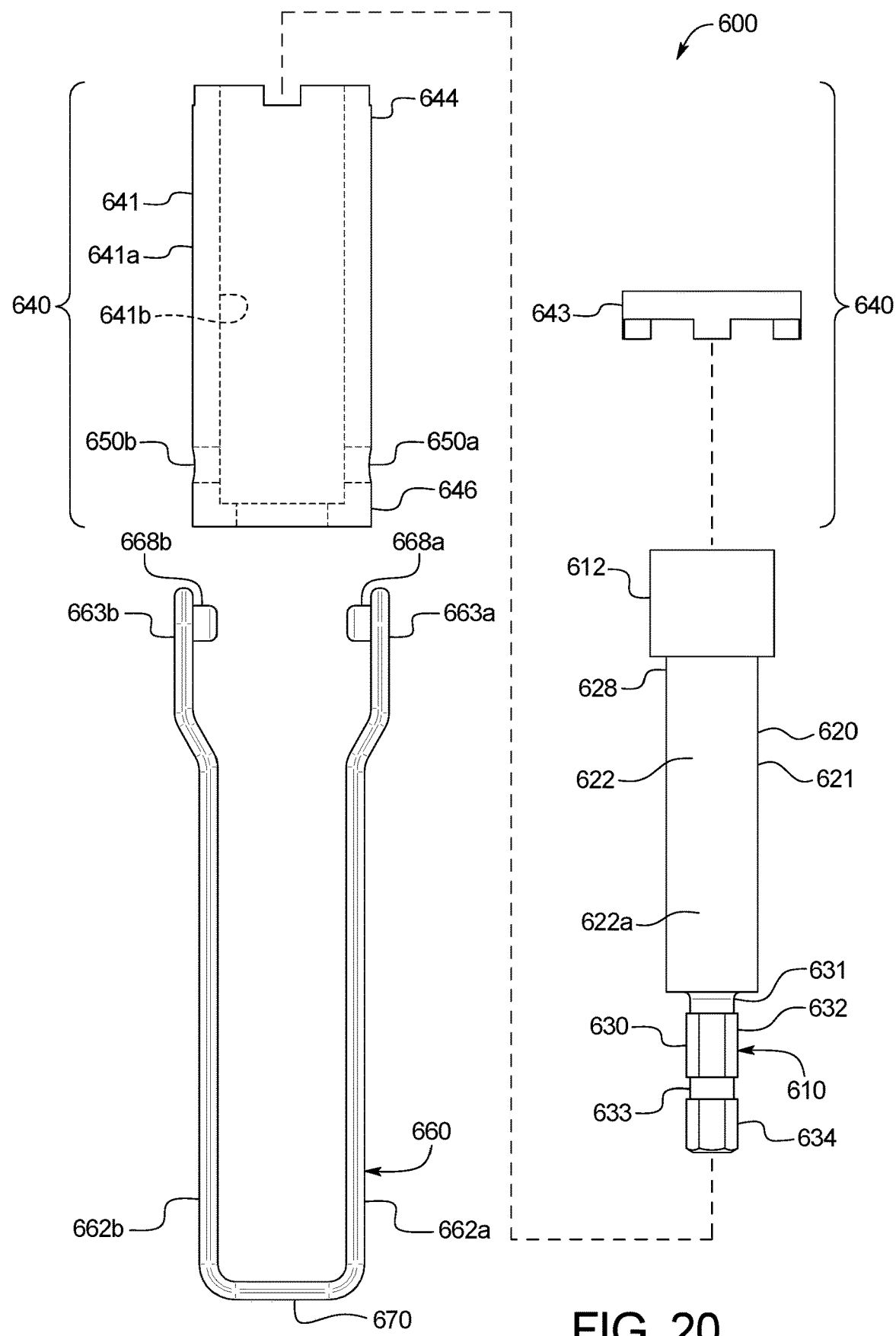
FIG. 20 is an exploded side view of the self-drilling expandable anchor installation tool of FIG. 17.
Figure 21:
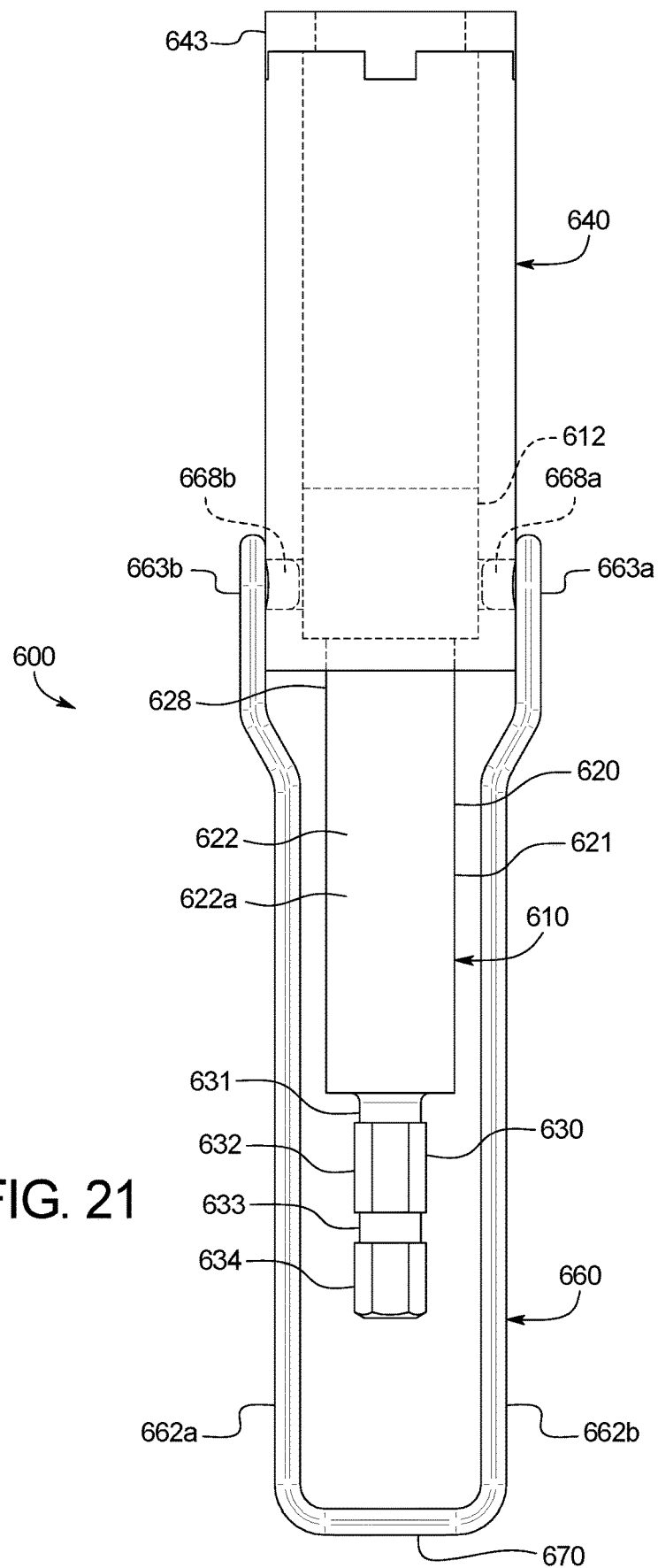
FIG. 21 is a side view of the self-drilling expandable anchor installation tool of FIG. 17.
Figure 22:
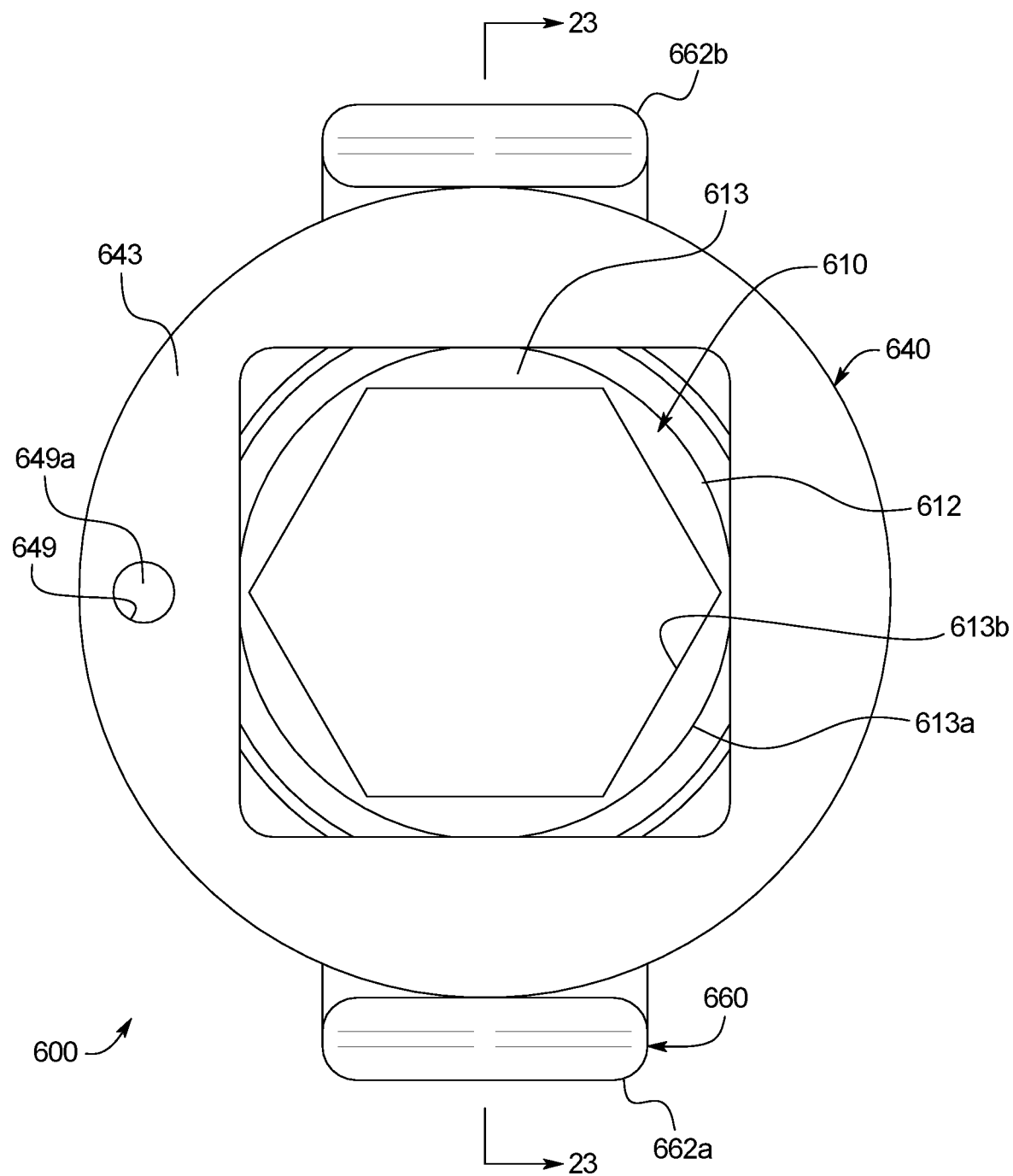
FIG. 22 is a front end view of the self-drilling expandable anchor installation tool of FIG. 17.
Figure 23:
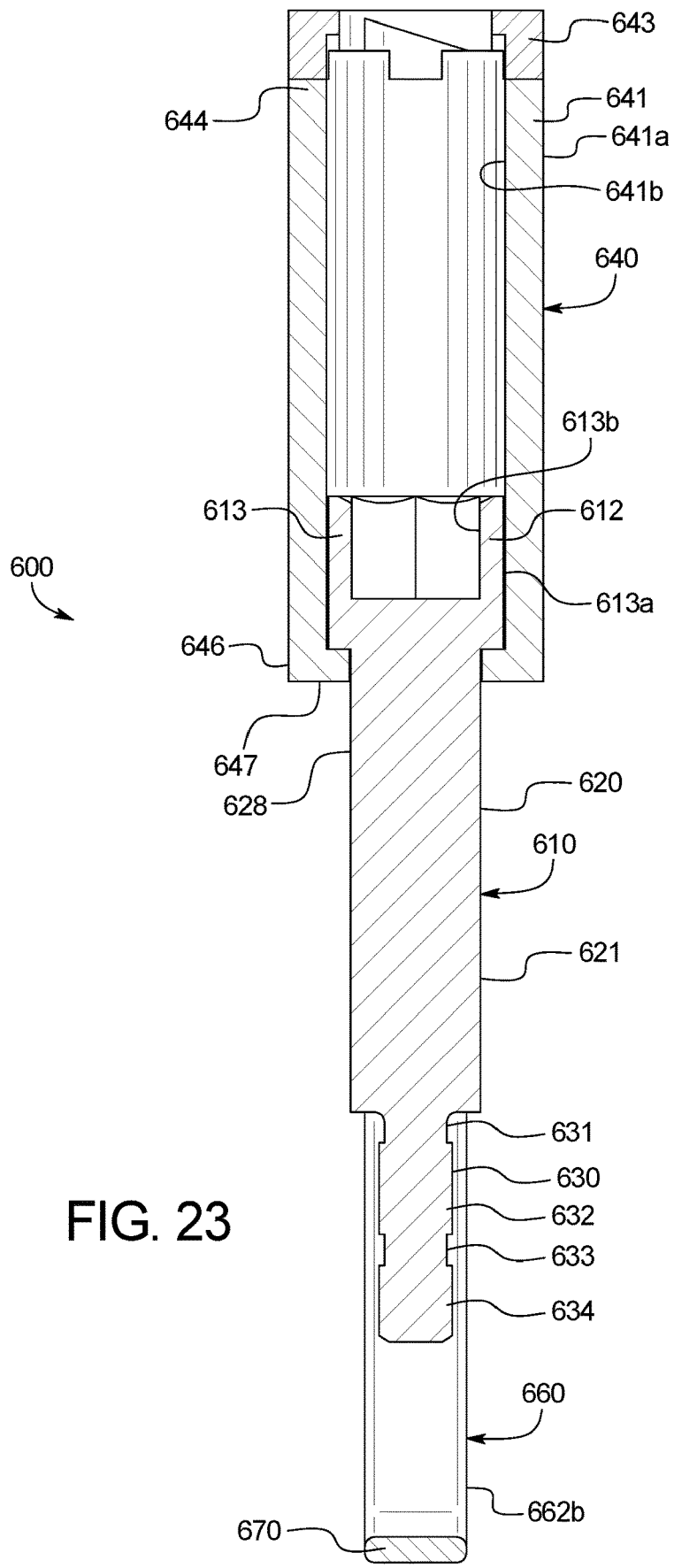
FIG. 23 is a cross-sectional view of the self-drilling expandable anchor installation tool of FIG. 17, taken substantially along line 23-23 of FIG. 22.

The handle 560 includes: (a) a first arm 562a; (b) a second arm 562b; (c) a shoulder 570 integrally (such as monolithically) connected to the first arm 562a and integrally (such as monolithically) connected to the second arm 562b, and integrally (such as monolithically) connecting the first arm 562a to the second arm 562b; (d) a first driver engagement pivot pin 568a integrally (such as monolithically) connected to the first arm 562a; and (e) a second driver engagement pivot pin 568b integrally (such as monolithically) connected to the second arm 562b. The first arm 562a and the second arm 562b are mirror images of each other in this example embodiment. The first arm 562a and the second arm 562b are spaced apart from each other. The first arm 562a and the second arm 562b are configured to fit over the back end of the drive tool engager 530 and over the expandable member engagement sleeve 540. Specifically, the first arm 562a includes a first hand 563a and the second arm 562b includes a second hand 563b that is spaced apart from the first hand 563a. The first driver engagement pivot pin 568a is integrally (such as monolithically) connected to the first hand 563a of the first arm 562a and extends inwardly from the first hand 563a of the first arm 562a. The second driver engagement pivot pin 568b is integrally (such as monolithically) connected to the second hand 563b of the second arm 562b and extends inwardly from the second hand 563b of the second arm 562b. The inner end of the first driver engagement pivot pin 568a extends through the opening 550a in the sleeve 540, into the pivot pin receipt area 528, and engages the outer surface 522a of the cylindrical wall 522 of the sleeve pivot pin receiver 520, as best shown in FIG. 14. The inner end of the second driver engagement pivot pin 568b extends through the opening 550b in the sleeve 540, into the pivot pin receipt area 528, and engages the outer surface 522a of the cylindrical wall 522 of the sleeve pivot pin receiver 520, as best shown in FIG. 14. The handle 560 is pivotally connected to the expandable member engagement sleeve 540 via the first driver engagement pivot pin 568a and the second driver engagement pivot pin 568b.

The sleeve 540, the pivot pin openings 550a and 550b in the sleeve 540, the arms 562a and 562b of the handle 560, and the pivot pins 568a and 568b are configured to facilitate: (1) rotation of the handle 560 about the pivot pins 568a and 568b relative to the expandable member engagement sleeve 540 and the driver 510; (2) longitudinal movement of the handle 560 and the pivot pins 568a and 568b with the expandable member engagement sleeve 540 relative to the driver 510; and (3) radial movement of the handle 560 and the pivot pins 568a and 568b with the expandable member engagement sleeve 540 relative to the driver 510. These movements enable: (1) the sleeve 540 to be pulled or positioned rearwardly relative to the driver 510 when the driver 510 is attached to the threaded member 160 to drill the hole in the structure; and (2) the sleeve 540 pushed forwardly and rotated to the appropriate position relative to the base 112 for alignment with and engagement with the base 112 regardless of the rotated position of the base 112, and thus to attach the sleeve 540 to the base 112 while the driver 510 is attached to the threaded member 160 to collapse and expand the second section 122 of the expandable tube 120 of the expandable member 110, as further described below.

The functioning and operation of the self-drilling expandable anchor installation tool 500 is further described below with respect to FIGS. 24A, 24B, 24C, 24D, and 24E.

Referring now to FIGS. 17, 18, 19, 20, 21, 22, 23, 25A, 25B, 25C, and 25D, another example embodiment of a self-drilling expandable anchor installation tool of the present disclosure, which is generally indicated by numeral 600, is illustrated. This illustrated example self-drilling expandable anchor installation tool 600 includes: (1) a driver 610; (2) an expandable member engagement sleeve 640 movably mounted on the driver 610; and (3) a handle 660 pivotally connected to the expandable member engagement sleeve 640. The self-drilling expandable anchor installation tool 600 is described herein with respect to the engagement with and the installation of the self-drilling expandable anchor 100 for brevity; however, it should be appreciated that the self-drilling expandable anchor installation tool 600 can be employed for engagement with and the installation of the self-drilling expandable anchor 200, or for engagement with and the installation of another suitable self-drilling expandable anchor in accordance with the present disclosure.

In this illustrated example embodiment, the self-drilling expandable anchor installation tool 600 is configured such that the self-drilling expandable anchor 100 is positionable inside of the expandable member engagement sleeve 640 as shown in 25A, 25B, 25C, and 25D. In this illustrated example embodiment, as the self-drilling expandable anchor 100 moves forwardly in and past a certain point in the expandable member engagement sleeve 640, the base 112 of the expandable member 110 self-aligns and self-engages a base engager 643 of the expandable member engagement sleeve 640 of the self-drilling expandable anchor installation tool 600 to enable the installer to hold the base 112 and the expandable member 100 stationary, as further described below. In this illustrated example embodiment, the driver 610, the expandable member engagement sleeve 640, and the handle 660 of the installation tool 600 are thus configured such that: (a) the driver 610 and a drive tool (such as a drill) can be connected to the hanger 150 of the self-drilling expandable anchor 100 that is positioned in the expandable member engagement sleeve 640; (b) the installation tool 600 and the drive tool can be employed to rotate the hanger 150, the expandable member 110, the threaded member 130, and the drill head 170 of the self-drilling expandable anchor 100 to drill a hole in a structure; (c) the installation tool 600 can be employed to insert the drill head 170, part of the expandable member 110, and part of the threaded member 130 through the drilled hole; (d) the expandable member engagement sleeve 640 and the handle 660 can then be employed by the installer to hold the base 112 of the expandable member 110 stationary while the driver 610 can be employed to rotate the hanger 150 and the threaded member 130 to cause part of the expandable member 110 to expand; and (e) after that part of the expandable member 110 expands such that the base 112 and that expanded part of the expandable member 110 secure the self-drilling expandable anchor 100 to the structure, the installation tool 600 can be detached from the self-drilling expandable anchor 100.

More specifically, the driver 610 is configured to engage and turn the hanger 150 to turn the threaded member 130 of the self-drilling expandable anchor 100 and thus turn the drill head 170 as further described below. The driver 610 includes: (a) a hanger base socket 612; (b) an extension 620 integrally (such as monolithically) connected to and extending from the hanger base socket 612; and (c) a drive tool engager 630 integrally (such as monolithically) connected to and extending from the extension 620. In various embodiments, the driver 610 is made from a suitable metal (such as steel); although it should be appreciated that the driver 610 can be made from other suitable materials.

The hanger base socket 612 includes a wall 613 having a cylindrical outer surface 613a and a hexagonal inner surface 613b configured to receive and mate with the hanger base 160 of the self-drilling expandable anchor 100 such that rotation of the driver 610 including the hanger base socket 612 causes rotation of the threaded member 160 of the self-drilling expandable anchor 100.

The extension 620 includes a first section 621 including a generally cylindrical solid member 622 including a cylindrical outer surface 622a. The first section 621 has a smaller outer diameter than that of the hanger base socket 612, although this component can be otherwise suitably formed. The extension 620 is not engaged by the pivot pins 668a and 668b (described below) in this example embodiment and does not limit the longitudinal movement of the pivot pins 668a and 668b or the expandable member engagement sleeve 640 relative to the hanger base socket 612.

The drive tool engager 630 has a solid body including a first section 631, a second section 632 integrally (such as monolithically) connected to and extending from first section 631, a third section 633 integrally (such as monolithically) connected to and extending from second section 632, and a fourth section 634 integrally (such as monolithically) connected to and extending from the third section 633. One or more of these sections are configured to mate with a drive tool (such as a drill 90 partially shown in FIGS. 25A, 25B, 25C, and 25D) or an extension (not shown) connected to a drive tool (such as a drill) in a conventional manner, as further described below, to cause the drive tool engager 630 to rotate.

The expandable member engagement sleeve 640 includes a sleeve 641 and an base engager 643. The sleeve 641 has a front end 644 and a back end 646. The sleeve 641 includes a stepped wall having an outer surface 641a and an inner surface 641b. The sleeve 641 and the inner surface 641b have a first section having an inner diameter and an interior passageway (not labeled) that is larger than: (1) the outer diameter of each part of the driver 610 including the hanger base socket 612; and (2) the outer dimensions of the base 112 of the expandable member 110 of the self-drilling expandable anchor 100. The sleeve 641 and the inner surface 641b have a second section at the back end 646 of the sleeve 641 that has an inner diameter and an interior passageway (not labeled) that is smaller than the outer diameter of the hanger base socket 612. In this illustrated example embodiment, the inwardly extending lip at the back end of the sleeve 641 is configured to engage the back surface of the socket 612 to limit the movement of the sleeve 641 relative to the driver 610.

The sleeve 641 and particularly the front end 644 of the cylindrical wall of the sleeve 641 is configured to securely receive the base engager 643. The base engager 643 defines four interior base receiving pockets 648a, 648b, 648c, and 648d that are configured to respectively receive the four corners of the base 112 of the expandable member 110 of the self-drilling expandable anchor 100 when the self-drilling expandable anchor 100 is moved forward in the sleeve 641 past a point in the sleeve 641 such that the base 112 is moved into engagement with the base engager 643, and specifically when the corners of the base 112 of the expandable member 110 of the self-drilling expandable anchor 100 are moved forward by the driver 510 into engagement with the base engager 643, as shown in FIGS. 25C and 25D. The engagement of the expandable member engager 643 and the base 112 of the expandable member 110 of the self-drilling expandable anchor 100 enables the expandable member engagement sleeve 640 to hold the base 112 in place without spinning after the expandable member 110 is inserted partially through the structure 50 and the installer desires to collapse and expand the strips of the expandable tube, as further described below.

In this illustrated example embodiment, each of the interior base receiving pockets 648a, 648b, 648c, and 648d is defined by multiple walls (not labeled) of base engager 643. These walls (e.g., the bottom and side walls) that define each pocket are sized to engage the rear surface 114 and a respective one of the side edges 115, 116, 117, and 118 of the respective corner of the base 112. These walls are also configured such that the base 112 is self-aligning in the base engager 643. More specifically, these walls are configured to first start receiving the base 112 and allowing the base 112 to continue to rotate a certain amount for alignment purposes in the base engager 643. After being aligned, the base engager 643 prevents the rotation of the base 112.

The base engager 643 includes four spaced apart legs 647a, 647b, 647c, and 647d that provide part of these walls and that facilitate the connection of base engager 643 to the sleeve 641. Leg 647a is shown having an inner cylindrical surface 649 that defines an inner fastener receiving passageway 649a that enables a fastener (not shown) to be employed to securely connect the base engager 643 to the sleeve 641. The fastener connects to the wall of the sleeve 641. While one leg of the base engager 643 is shown having this fastener receiving passageway, more than one of the legs of the base engager 643 may have such fastener receiving passageways. It should also be appreciated that other suitable attachment mechanisms may be employed to attach the base engager 643 to the sleeve 641 in accordance with the present disclosure.

The sleeve 641 also defines two opposing pivot pin openings 650a and 650b near the back end 546 of the sleeve 641.

The handle 660 includes: (a) a first arm 662a; (b) a second arm 662b; (c) a shoulder 670 integrally (such as monolithically) connected to the first arm 662a and integrally (such as monolithically) connected to the second arm 662b, and integrally (such as monolithically) connecting the first arm 662a to the second arm 662b; (d) a first driver engagement pivot pin 668a integrally (such as monolithically) connected to the first arm 662a; and (e) a second driver engagement pivot pin 668b integrally (such as monolithically) connected to the second arm 662b. The first arm 662a and the second arm 662b are mirror images of each other in this example embodiment. The first arm 662a and the second arm 662b are spaced apart from each other. The first arm 662a and the second arm 662b are configured to fit over the back end of the drive tool engager 630 and over the sleeve 641. Specifically, the first arm 662a includes a first hand 663a and the second arm 662b includes a second hand 663b that is spaced apart from the first hand 663a. The first driver engagement pivot pin 668a is integrally (such as monolithically) connected to the first hand 663a of the first arm 662a and extends inwardly from the first hand 663a of the first arm 662a. The second driver engagement pivot pin 668b is integrally (such as monolithically) connected to the second hand 663b of the second arm 662b and extends inwardly from the second hand 663b of the second arm 662b. The handle 660 is pivotally connected to the expandable member engagement sleeve 641 via the first driver engagement pivot pin 668a and the second driver engagement pivot pin 668b.

The sleeve 641 and the handle 660 are configured to facilitate: (1) rotation of the handle 660 about the pivot pins 668a and 668b relative to the sleeve 641, the base engager 643, and the driver 610; (2) longitudinal movement of the handle 660, the sleeve 641, and the base engager 643 relative to the driver 610; and (3) radial movement of the handle 660, the sleeve 641, and the base engager 643 relative to the driver 610. This configuration enables the movement of the self-drilling anchor assembly 100 and the driver 610 in the sleeve 641 and relative to the base engager 643.

The functioning and operation of the self-drilling expandable anchor installation tool 600 is further described below with respect to FIGS. 25A, 25B, 25C, 25D, and 25E.

Turning now to FIGS. 24A to 24E, one example method of use and installation of the self-drilling expandable anchor 100 into a structure 50 using a driving tool such as a drill 90 and using the self-drilling expandable anchor installation tool 500 is generally shown. It should be appreciated that this example method can also be employed to install the self-drilling expandable anchor 200 into a structure.

FIG. 24A shows the self-drilling expandable anchor 100 positioned below the structure 50, the self-drilling expandable anchor installation tool 500 positioned below the structure 50 and attached to the self-drilling expandable anchor 100, and the drill 90 attached to the self-drilling expandable anchor installation tool 500. At this point in the installation process: (1) the driver 510 of the installation tool 500 is engaging the hanger base 161 of the hanger 150; and (2) the drill 90 is engaging the driver 510 of the installation tool 500. The drill 90 and installation tool 500 are used to cause the drill head 170 to engage the outer surface of the support 50. The drill 90 is used to rotate the driver 510, which causes the expandable anchor 100 including the drill head 170 to rotate. This causes a drilled hole to be formed in the support 50. During this part of the installation process, the sleeve 540 is not engaging the base 112 of the expandable member 110 to hold the base 112 stationary, and thus the entire expandable anchor 100 rotates.

FIG. 24B shows the self-drilling expandable anchor 100 positioned partially through the drilled hole formed in the structure 50 by the drill head 170 of self-drilling expandable anchor 100, the self-drilling expandable anchor installation tool 500 positioned below the structure 50 and attached to the self-drilling expandable anchor 100, and the drill 90 attached to the self-drilling expandable anchor installation tool 500. At this point in the installation process: (1) the driver 510 of the installation tool 500 is still engaging the hanger base 161 of the hanger 150; (2) the drill 90 is still engaging the driver 510 of the installation tool 500; and (3) the base 112 of the expandable member 110 is engaging the outer surface of the support 50. At this point in the installation process, the sleeve 540 is not yet engaging the base 112 of the expandable member 110 to hold the base 112 stationary.

FIG. 24C shows the self-drilling expandable anchor 100 positioned partially through a drilled hole formed in the structure 50 by the self-drilling expandable anchor 100, the self-drilling expandable anchor installation tool 500 positioned below the structure 50 and attached to the self-drilling expandable anchor 100, and the drill 90 attached to the self-drilling expandable anchor installation tool 500. At this point in the installation process: (1) the driver 510 of the installation tool 500 is still engaging the hanger base 161 of the hanger 150; (2) the drill 90 is still engaging the driver 510 of the installation tool 500; and (3) the base 112 of the expandable member 110 is engaging the outer surface of the support 50. At this point, since the sleeve 540 is radially movable about the driver 510, the installer can position the sleeve 540 such that it is suitably aligned with the base 112 of the expandable member 110 such that the corners of the base 112 can be received in the pockets 548a, 548b, 548c, and 548d of the sleeve 540. After this alignment, the installer can move the sleeve 540 forward (e.g., upward in this example) such that the sleeve 540 engages the base 112 of the expandable member 110 to hold the base 112 and the entire expandable member 110 stationary. At this point, the installer can hold the handle 560 to prevent rotation of the sleeve 540 and thus to prevent rotation of the base 112 and the entire expandable member 110.

FIG. 24D shows the self-drilling expandable anchor 100 positioned partially through a drilled hole formed in the structure 50 by the self-drilling expandable anchor 100, the self-drilling expandable anchor installation tool 500 positioned below the structure 50 and attached to the self-drilling expandable anchor 100, and the drill 90 attached to the self-drilling expandable anchor installation tool 500. At this point in the installation process: (1) the driver 510 of the installation tool 500 is still engaging the hanger base 161 of the hanger 150; (2) the drill 90 is still engaging the driver 510 of the installation tool 500; and (3) the base 112 of the expandable member 110 is engaging the outer surface of the support. At this point, the sleeve 540 is still positioned such that the corners of the base 112 are in the pockets 548a, 548b, 548c, and 548d of the sleeve 540, the installer has held the handle 560 to prevent rotation of the sleeve 540 and thus to prevent rotation of the base 112 and the entire expandable member 110, and the installer has caused the drill 90 to further rotate the driver 510 which in turn has rotated the threaded member 150 such that the engagement of the outer threads and the section 120 of the expandable member 110 have caused the section 122 of the expandable member 110 to partially collapse and to expand. It should be appreciated that the amount of expansion can vary and that the expanded strips 128a, 128b, 128c, and 128d may be in more of an engagement with the inner surface of the support 50 as shown in FIG. 24E.

FIG. 24E shows the self-drilling expandable anchor 100 positioned partially through a drilled hole formed in the structure 50 by the self-drilling expandable anchor 100 and attached to the structure 50. At this point in the installation process: (1) the drill 90 and the installation tool 500 have been disconnected from the expandable anchor 100; and (2) the expandable anchor 100 is connected to the support. It should be appreciated that the amount of expansion can vary and that the expanded strips 128a, 128b, 128c, and 128d are in full engagement with the inner surface of the support 50. At this point, a threaded member or rod (not shown) can be connected to the hanger 50. It should be appreciated that strips 128a, 128b, 128c, and 128d will not fit through the drilled hole in the support 50 and will provide a suitable pull out strength strong enough to support items attached to the hanger 150.

Turning now to FIGS. 25A to 24E, one example method of use and installation of the self-drilling expandable anchor 100 into a structure 50 using a driving tool such as a drill 90 and using the self-drilling expandable anchor installation tool 600 is generally shown. It should be appreciated that this example method can also be employed to install the self-drilling expandable anchor 200 into a structure.

FIG. 25A shows the self-drilling expandable anchor installation tool 600 positioned below the structure 50, the self-drilling expandable anchor 100 positioned inside of the expandable member engagement sleeve 640 of the self-drilling expandable anchor installation tool 600, and the self-drilling expandable anchor installation tool 600 attached to the self-drilling expandable anchor 100. It should be appreciated that the self-drilling expandable anchor 100 is positioned inside of the expandable member engagement sleeve 640 of the self-drilling expandable anchor installation tool 600 prior to positioning the self-drilling expandable anchor installation tool 600 adjacent to the structure 50. At this point in the installation process: (1) the driver 610 of the installation tool 600 is engaging the hanger base 161 of the hanger 150; and (2) the drill 90 is engaging the driver 610 of the installation tool 600. The drill 90 and installation tool 600 are then used to cause the drill head 170 to engage the outer surface of the support 50. The drill 90 is then used to rotate the driver 610, which causes the expandable anchor 100 including the drill head 170 to rotate. This causes drilled hole to be formed in the support 50. At this point in the installation process, the base engager 643 of the sleeve 640 is not engaging the base 112 to hold the base 112 stationary, and thus the entire expandable anchor 100 rotates inside of the expandable member engagement sleeve 640.

FIG. 25B shows the self-drilling expandable anchor 100 positioned partially through the drilled hole formed in the structure 50 by the drill head 170 of self-drilling expandable anchor 100, the self-drilling expandable anchor installation tool 600 positioned below the structure 50 and attached to the self-drilling expandable anchor 100, and the drill 90 attached to the self-drilling expandable anchor installation tool 600. At this point in the installation process: (1) the driver 610 of the installation tool 600 is still engaging the hanger base 161 of the hanger 150; (2) the drill 90 is still engaging the driver 610 of the installation tool 600; and (3) the base 112 of the expandable member 110 is not yet engaging the outer surface of the support. At this point in the process, the base engager 643 of the sleeve 640 is not yet engaging the base 112 to hold the base 112 stationary (i.e., the base 112 has not moved into the base engager 643 yet).

FIG. 25C shows the self-drilling expandable anchor 100 positioned partially through a drilled hole formed in the structure 50 by the self-drilling expandable anchor 100, the self-drilling expandable anchor installation tool 600 positioned below the structure 50 and attached to the self-drilling expandable anchor 100, and the drill 90 attached to the self-drilling expandable anchor installation tool 600. At this point in the installation process: (1) the driver 610 of the installation tool 600 is still engaging the hanger base 161 of the hanger 150; (2) the drill 90 is still engaging the driver 610 of the installation tool 600; and (3) the base 112 of the expandable member 110 is engaging the outer surface of the support 50. At this point, the base 112 has also moved forwardly (e.g., upwardly in this example) such that the corners of the base 112 are received in the pockets 648a, 648b, 648c, and 648d of the base engager 643 of the expandable member engagement sleeve 640. After this alignment and engagement, the installer can hold the handle 660 to prevent rotation of the expandable member engagement sleeve 640 and thus to prevent rotation of the base 112 of the expandable member 110.

FIG. 25D shows the self-drilling expandable anchor 100 positioned partially through a drilled hole formed in the structure 50 by the self-drilling expandable anchor 100, the self-drilling expandable anchor installation tool 600 positioned below the structure 50 and attached to the self-drilling expandable anchor 100, and the drill 90 attached to the self-drilling expandable anchor installation tool 600. At this point in the installation process: (1) the driver 510 of the installation tool 500 is still engaging the hanger base 161 of the hanger 150; (2) the drill 90 is still engaging the driver 610 of the installation tool 600; and (3) the base 112 of the expandable member 110 is engaging the outer surface of the support. At this point, the base 112 of the expandable member 110 is positioned such that the corners of the base 112 are in the pockets 648a, 648b, 648c, and 648d of the base engager 643 of the expandable member engagement sleeve 640, the installer has held the handle 660 to prevent rotation of the sleeve 640 and thus to prevent rotation of the base 112 and the entire expandable member 110, and the installer has caused the drill 90 to rotate the driver 610 which in turn has rotated the threaded member 150 such that the engagement of the outer threads 142a of the section 142 of the threaded member 130 with the inner threads 125 of the section 120 of the expandable member 110 have caused the section 122 of the expandable member 110 to partially collapse and to expand. It should be appreciated that the amount of expansion can vary and that the expanded strips 128a, 128b, 128c, and 128d may be in more of an engagement with the inner surface of the support 50 as shown in FIG. 25E.

FIG. 25E shows the self-drilling expandable anchor 100 positioned partially through a drilled hole formed in the structure 50 by the self-drilling expandable anchor 100 and attached to the structure 50. At this point in the installation process: (1) the drill 90 and the installation tool 600 have been disconnected from the expandable anchor 100; and (2) the expandable anchor 100 is connected to the support. It should be appreciated that the amount of expansion can vary and that the expanded strips 128a, 128b, 128c, and 128d are in full engagement with the inner surface of the support 50. At this point, a threaded member or rod (not shown) can be connected to the hanger 50. The strips will not fit through the drilled hole and will provide a pull out strength strong enough to support items attached to the hanger 150.

It should be appreciated that the installation tools of the present disclosure such as example installation tools 500 and 600 can be employed to install expandable anchor assemblies that are not self-drilling such as but not limited to the commercially available expandable anchors sold by the assignee of this disclosure under the trademark SAMMYS X-PRESS.

It should be appreciated that the installation tools of the present disclosure such as example installation tools 500 and 600 can be employed to install expandable anchor assemblies or self-drilling expandable anchors disclosed in U.S. Pat. No. 6,935,821 which is incorporated herein by reference.

In alternative embodiments of the present disclosure, the drill head may be secured to the threaded member or the expandable member of the self-drilling expandable anchor in other suitable manners. In certain such alternative embodiments of the present disclosure, the drill head may be press fit into the expandable member of the self-drilling expandable anchor. In certain such alternative embodiments of the present disclosure, the drill head may integrally connected to the expandable member of the self-drilling expandable anchor.

In alternative embodiments of the present disclosure, the drill head is eliminated from the self-drilling expandable anchor. In certain such alternative embodiments of the present disclosure, the front end of the expandable member of the self-drilling expandable anchor is formed as a hole saw or as another suitable cutting device.

In alternative embodiments of the present disclosure, the drill head is eliminated from the self-drilling expandable anchor. In certain such alternative embodiments of the present disclosure, the front end of the threaded member is formed as a hole saw or as another suitable cutting device.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A single-bodied self-drilling expandable anchor comprising:
   an expandable member including a first end and a second end, the expandable member including a base at the first end and an expandable tube connected to and extending from the base, the base having one or more larger outer dimensions than the expandable tube and a front surface, a back surface, and four side edges, the base and the expandable tube defining an inner passageway, the expandable tube including a first section at the second end and a second section between the first section and the base, the first section including inner threads, the second section not including inner threads and being expandable relative to the base and to the first section;
   a hanger including a threaded member connector having inner threads and a hanger base connected to and extending from the threaded member connector;
   a threaded member including a partially threaded shaft including a first section including outer threads, a second section that does not have outer threads, and a third section that includes outer threads, the shaft configured to extend through the inner passageway of the expandable member such that the first section extends out of the first end of the expandable member, the third section extends out of the second end of the expandable member, the outer threads of the first section are configured to engage the inner threads of the first section of the expandable tube, the outer threads of the third section are configured to engage the inner threads of the threaded member connector to connect the threaded member connector and the hanger to the threaded member;
   a friction reducing element disposed between the base of the expandable member and the threaded member; and
   a drill head including a connector and a drill tip connected to and extending from the connector, the connector connectable to the first section of the threaded member,
   wherein the drill tip is configured to rotate as the threaded member is rotated,
   wherein the self-drilling expandable anchor is configured to be installed in one step, and wherein each of the four side edges includes two top and bottom opposing inwardly beveled surfaces and an outer surface.

2. The self-drilling expandable anchor of claim 1, wherein the connector of the drill head is fixedly connected to the first section of the threaded member.

3. The self-drilling expandable anchor of claim 1, wherein the second section of the expandable tube defines a series of slots that facilitate the expansion of the second section of the expandable tube.

4. The self-drilling expandable anchor of claim 1, wherein the second section of the expandable tube has an outward bulge that facilitates the expansion of the second section of the expandable tube.

5. The self-drilling expandable anchor of claim 1, which is configured such that without the base being held stationary, rotation of the hanger causes rotation of the threaded member, rotation of the expandable member, and rotation of the drill head.

6. The self-drilling expandable anchor of claim 5, which is configured such that with the base being held stationary, rotation of the hanger causes rotation of the threaded member and rotation of the drill head, does not cause rotation of the expandable member, and causes expansion of the second section of the expandable tube.

7. The self-drilling expandable anchor of claim 1, wherein the connector of the drill tip is directly fixedly connected to the second section of the threaded member.

8. The self-drilling expandable anchor of claim 1, wherein the connector of the drill tip is welded to the second section of the threaded member.

9. The self-drilling expandable anchor of claim 1, wherein the drill tip is forged.

10. A self-drilling expandable anchor comprising:
    an expandable member including a base and an expandable tube connected to and extending from the base, the base having one or more larger outer dimensions than the expandable tube and a front surface, a back surface and four side edges, the base and the expandable tube defining an inner passageway, the expandable tube including a first section and a second section between the first section and the base, the first section including inner threads, the second section not including inner threads and being expandable relative to the base and to the first section;
    a threaded member configured to extend through the expandable member, the threaded member having a head and a threaded shaft connected at a first end to the head, the threads configured to engage the inner threads of the first section of the expandable tube, the threaded shaft having a second end opposite first end, and configured to be connected to the connector of the drill head;
    a drill head including a connector and a drill tip connected to and extending from the connector, wherein the drill tip includes inner threads configured to threadably engage the outer threads of the second section of the threaded member;
    a friction reducing element disposed between the base of the expandable member and the threaded member; and
    a hanger including a threaded member connector having inner threads and securely attachable to the head of the threaded member and a hanger base connected to and extending from the threaded member connector,
    wherein the self-drilling expandable anchor is configured to be installed in one step, and
    wherein each of the four side edges includes two top and bottom opposing inwardly beveled surfaces and an outer surface.

11. The self-drilling expandable anchor of claim 10, wherein the second section of the expandable tube defines a series of slots that facilitate the expansion of the second section of the expandable tube.

12. The self-drilling expandable anchor of claim 10, wherein the second section of the expandable tube has an outward bulge that facilitates the expansion of the second section of the expandable tube.

13. The self-drilling expandable anchor of claim 10, which is configured such that without the base being held stationary, rotation of the hanger causes rotation of the threaded member, rotation of the expandable member, and rotation of the drill head.

14. The self-drilling expandable anchor of claim 13, which is configured such that with the base being held stationary, rotation of the hanger causes rotation of the threaded member and rotation of the drill head, does not cause rotation of the expandable member, and causes expansion of the second section of the expandable tube.

15. The self-drilling expandable anchor of claim 10, wherein the connector of the drill tip is directly fixedly connected to the second section of the threaded member.

16. The self-drilling expandable anchor of claim 10, wherein the connector of the drill tip is welded to the second section of the threaded member.

17. The self-drilling expandable anchor of claim 10, wherein the drill tip is machined.

\* \* \* \* \*